United States Patent
Abe et al.

(10) Patent No.: US 10,832,301 B2
(45) Date of Patent: Nov. 10, 2020

(54) SYSTEM AND METHOD FOR STAMP ORDERING AND THERMAL CARVING

(71) Applicant: SHACHIHATA INC., Nagoya (JP)

(72) Inventors: Eiji Abe, Nagoya (JP); Masayoshi Uchida, Nagoya (JP)

(73) Assignee: SHACHIHATA INC., Nagoya (JP)

( * ) Notice: Subject to any disclaimer, the term of this patent is extended or adjusted under 35 U.S.C. 154(b) by 583 days.

(21) Appl. No.: 14/982,314

(22) Filed: Dec. 29, 2015

(65) Prior Publication Data
US 2016/0217517 A1   Jul. 28, 2016

(30) Foreign Application Priority Data

Jan. 26, 2015 (JP) .................................. 2015-012596

(51) Int. Cl.
  *G06Q 30/06* (2012.01)
  *B41D 7/00* (2006.01)
  (Continued)

(52) U.S. Cl.
  CPC ............ *G06Q 30/0621* (2013.01); *B41D 7/00* (2013.01); *B41K 99/00* (2013.01); *G05B 19/182* (2013.01);
  (Continued)

(58) Field of Classification Search
  CPC ...................................................... G06Q 30/06
  (Continued)

(56) References Cited

U.S. PATENT DOCUMENTS 5,422,662 A * 6/1995 Fukushima ................ B41J 2/37
                                                                 347/211
5,741,459 A * 4/1998 Ando ................... B29C 44/5636
                                                                 101/333
(Continued)

FOREIGN PATENT DOCUMENTS

JP     2002-169261 A1   6/2002
WO    2007/071073 A1   6/2007

OTHER PUBLICATIONS

Roy, Sudeshna, et al. "Thermally Tailored Gradient Topography Surface on Elastomeric Thin Films." ACS Applied Materials & Interfaces, vol. 6, No. 9, 2014, pp. 6579-6588., doi:10.1021/am500163s.*
(Continued)

*Primary Examiner* — Jeffrey A. Smith
*Assistant Examiner* — Jennifer V Lee
(74) *Attorney, Agent, or Firm* — Burr & Brown, PLLC

(57) ABSTRACT

A host computer, a plurality of thermal carving machines, and a user terminal are connected to a network. The host computer includes seal image creation means that permits edition of a seal image using the user terminal, site selection means that allows a user to specify one site from a site candidates list, ID issuing means that issues an order ID for identifying the contents of an order, and order information registration means that registers the issued order ID and order information in a database. A control device of the thermal carving machine includes order acceptance means that accepts an order ID input when information on the input order ID is registered in the database, and carving control means that performs seal carving of a stamp based on seal image data associated with the order ID.

6 Claims, 21 Drawing Sheets

(51) Int. Cl.
*B41K 99/00* (2006.01)
*G05B 19/18* (2006.01)
*G06Q 50/04* (2012.01)
*B29C 35/00* (2006.01)

(52) U.S. Cl.
CPC ..... *G06Q 30/0635* (2013.01); *G06Q 30/0643* (2013.01); *G06Q 50/04* (2013.01); *G05B 2219/45212* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 6,732,649 B1* | 5/2004 | Wall | B41D 7/00 |
| | | | 101/333 |
| 2003/0033222 A1* | 2/2003 | Fuwa | G06Q 10/087 |
| | | | 705/26.2 |
| 2003/0129380 A1* | 7/2003 | Nakao | B41N 1/24 |
| | | | 428/311.31 |
| 2005/0096967 A1* | 5/2005 | Gerrits | G06Q 10/087 |
| | | | 705/26.81 |
| 2005/0102151 A1* | 5/2005 | Fuwa | G06Q 30/06 |
| | | | 705/26.5 |
| 2012/0009036 A1 | 1/2012 | Marcos et al. | |

OTHER PUBLICATIONS

European Search Report, European Application No. 16151070.6, dated Jun. 3, 2016 (8 pages).

* cited by examiner

Fig.9

| | SQUARE TYPE STAMP/ Size Code 1551 |
|---|---|

<RETURN

STEP 1 Product Selection | STEP 2 Data selection | STEP 3 Comfirmation | STEP 4 Site selection STEP3  Final Comfirmation

| Product Picuture | Seal Face |
|---|---|
| | RECEIVED<br>Year Month Day |
| | Full Scale 15 × 15mm |

| Category | Type | Ink | Font | Number of order |
|---|---|---|---|---|
| SQUARE | 1551 | Black | | 1 |

Comfermation>

54

(e)

(f)

(g)

SYSTEM AND METHOD FOR STAMP ORDERING AND THERMAL CARVING

BACKGROUND OF THE INVENTION

Field of the Invention

The present invention relates to a stamp ordering system that ensures ordering of the manufacture of a stamp over a network.

Description of Related Art

There have been proposed systems of creating artworks of stamps using a network (see Patent Literature 1, for example). According to the conventional system disclosed in Patent Literature 1, a server and an artwork creation terminal, which are located on the side of an artwork creator, and a seal creation terminal located on the side of a seal creator are connected to a network. The server creates seal image data based on data needed to create a seal, which is transmitted from the seal creation terminal. The server also adds seal information (information such as characters, a font, a layout pattern and a character size) to the seal image data to create display data adjustable on the screen of the seal creation terminal. The seal creation terminal located on the side of the seal creator creates image data of an artwork based on the seal information stored in the server and data, such as characters, a font, and a layout pattern corresponding to those in the seal information, which is prestored in a memory device.

This conventional system does not need to transmit and receive a vast amount of image data to and from a network, and thus has advantages of reducing the data load on the system, and allowing even an ordinary user who does not have dedicated seal creation software to create an original artwork via the server.

CITATION LIST

Patent Literature

Patent Literature 1: Japanese Patent Application Laid-open No. 2002-169261

SUMMARY OF INVENTION

Problem to be Solved by the Invention

Recently, information infrastructures, such as high-speed Internet and Wi-Fi spots, are organized so that online selling and services using personal computers and cellular communication terminals can be provided at anywhere in the country. However, according to the above-described conventional artwork creation system, for example, locations at which artworks of seals are created are limited to a stamp manufacturing factory or the like where a server and artwork creation terminals are installed. When an orderer (seal creator) lives comparatively far from the stamp manufacturing factory (artwork creator), therefore, it may take at least several days to deliver an ordered product to the ordering party after the stamp is ordered.

The invention has been made in view of such a problem and a situation, and it is an object of the invention to provide a very convenient stamp ordering service capable of, for example, allowing ordinary users to easily order stamps and shortening the period from the ordering of a stamp to the reception thereof as compared with the conventional systems.

Means for Solving the Problems

To solve the aforementioned problem, the invention provides a stamp ordering system including a host computer which is connected to a network, and a plurality of seal carving apparatuses located at a plurality of sites in such a way as to be connectable to the network,
the host computer including seal image creation means that creates seal image data in such a way that a user can edit a seal using a terminal device connected to the network, site selection means that allows the user to specify at least one of the plurality of sites where the seal carving apparatuses connected to the network are located, ID issuing means that issues an ID for identifying set contents of an order, and order information registration means that registers information on the issued ID and order information associated with the ID in a database connected to the network, each of the seal carving apparatuses located at the plurality of sites including order acceptance means that, when the ID is input, accepts the input ID when the information on the input ID is registered in the database on the network, and carving control means that performs seal carving of a stamp ordered by the user based on the seal image data which is identified by the accepted ID.

The stamp ordering system may be configured so that when ordered via the terminal device, the host computer transmits the seal image data over the network to the seal carving apparatus specified by the user.

The stamp ordering system may be configured so that when ordered via the terminal device, the host computer transmits the order information over the network to the seal caning apparatus specified by the user.

The stamp ordering system may be configured so that the order acceptance means of the seal carving apparatus retrieves the order information based on the input ID, and does not accept the input ID when information on the site where the seal carving apparatus is located does not match site information in the retrieved order information.

The stamp ordering system may be configured so that the seal cawing apparatus comprises operational status transmission means that transmits operational status information of the seal carving apparatus over the network to the host computer as needed.

Further, the invention provides a method of ordering a stamp in a system including a computer which is connected to a network, and a plurality of seal carving apparatuses located at a plurality of sites in such a way as to be connectable to the network, the method including steps to be executed by the computer, the steps including:
  creating seal image data in such a way that a user can edit a seal using a terminal device connected to the network;
  allowing the user to specify at least one of the plurality of sites Where the seal carving apparatuses connected to the network are located;
  issuing an ID for identifying set contents of an order; and
  registering information on the issued ID and order information associated with the ID in a database connected to the network,
  the method further including steps to be executed by each of the seal carving apparatuses, the steps including:
  when the ID is input, accepting the input ID when the information on the input ID is registered in the database on the network; and performing seal carving of a stamp ordered by the user based on the seal image data which is identified by the accepted ID.

Effects of the Invention

The stamp ordering system according to the invention can facilitate creation of stamps desired by users and ordering of stamps. Further, this stamp ordering system can shorten the period from the ordering of a stamp to the reception thereof as compared with the conventional systems. This can provide a stamp ordering service very convenient to users.

BRIEF DESCRIPTION OF DRAWINGS

FIG. 9 is a diagram illustrating a final confirmation screen for the contents of an order, which is provided to the user terminal.

DETAILED DESCRIPTION OF THE INVENTION (Description of the General Configuration of Stamp Ordering System)

Figure 1:
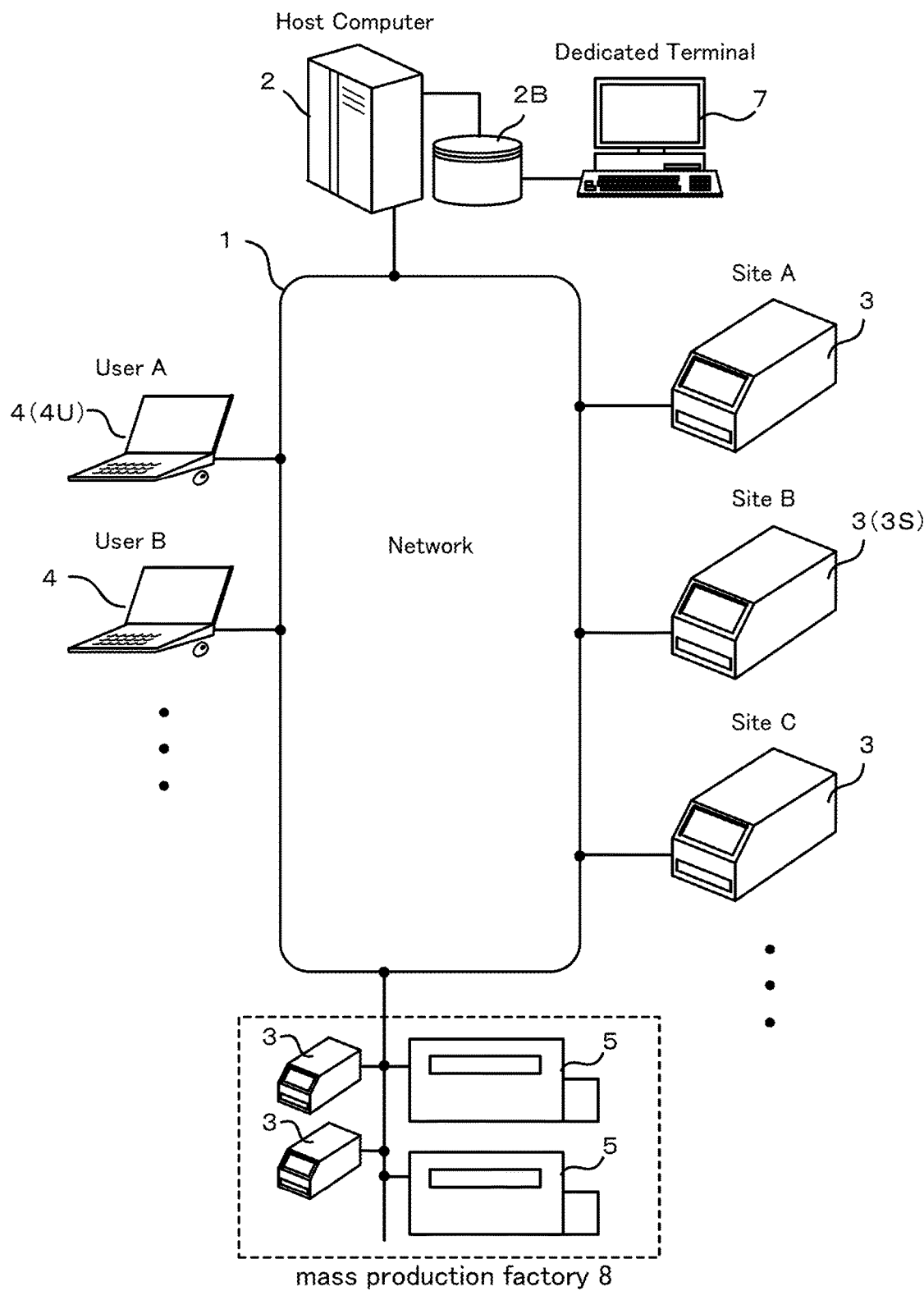
FIG. 1 is a diagram illustrating the general configuration of a stamp ordering system according to an embodiment.

FIG. 1 is a diagram illustrating the general configuration of a stamp ordering system according to the embodiment, which enables ordering of stamps over a network 1. The network 1 is, for example, the Internet. The network 1 is connected in an interactive manner with a host computer 2, and a plurality of thermal carving machines 3, 3, . . . which are seal carving apparatuses located at a plurality of sites.

The host computer 2 is a computer such as a work station which is operated and managed by a stamp ordering service provider (e.g., a stamp manufacturing/sales company or the like). As described later, the host computer 2 includes a plurality of control means for achieving various functions, and those control means perform arithmetic operations according to predetermined programs to generally control the overall stamp ordering system. The host computer 2 should not necessarily be a single computer, but may be a computer system in which some control means are distributively provided in each of a plurality of computers according to the respective functions.

The host computer 2 is connected with a database 28. The database 2B stores information on user accounts, a history of order information, operational information of seal carving apparatuses located at registered sites, and the like. Those pieces of information in the database 213 are basically updated to latest information by the host computer 2 as needed. The database 2B may be connected to the network 1 via a database server (not shown) or the like. In addition, various programs to operate the host computer 2 are stored in a storage device within the host computer 2.

The database 2B is also connected with a dedicated terminal 7 in an accessible manner. The dedicated terminal 7 is used by a dedicated designer to, for example, create an artwork of a stamp (also referred to as "seal image") according to the order from a user (orderer). The dedicated terminal 7 may be connected to the host computer 2 over the network 1 or a local intranet (not shown).

The seal carving apparatus including the thermal carving machine 3 carves a seal member of a stamp according to given seal image data (artwork data). A stamp that is handled in the stamp ordering system is preferably a porous stamp 100 whose seal member is made of a porous stamp material. In the description of the embodiment, the thermal carving machine 3 that forms a desired seal on a porous material by thermal carving is described as the seal carving apparatus by way of example. It is to be noted however that a carving machine other than the thermal carving machine, such as a laser carving machine 5 located in, for example, a mass production factory 8 of a maker, may be included as a seal carving apparatus as illustrated in FIG. 1. In other words, in working out the invention, the stamp ordering system may be a system that can provide stamps of various carving qualities according to demands of users.

It is preferable that the thermal carving machines 3, 3, . . . should be installed at a plurality of sites distributed over as wide a range as possible. The term "site" refers to a place where the thermal carving machine 3 is located, or a place where a seal is carved and a stamp is assembled and/or is delivered to a user. Typically, sites correspond to, for example, stores where stamps are sold, such as stationery stores and convenience stores. Further, the thermal carving machine 3 may be installed in a facility; such as an amusement center where game machines or the like are installed, at which stamps have not been sold conventionally.

The stamp ordering system according to the embodiment provides services such as edition of a seal image and ordering of a stamp, as users access the host computer 2 over the network 1 using user terminals 4, 4, . . . , which are terminal devices connected to the network 1.

The types of the user terminals 4, 4, . . . are not restricted but may be a personal computer (PC), a tablet PC, a smartphone and the like as long as each user terminal 4, 4, . . . is connectable to the network 1 and is a computer installed with an OS (Operating System) that is compatible with the application services of the host computer 2. The term "user" refers to a person who uses the stamp ordering system. In addition, a user who performs a series of input operations (edition of a seal image, designation of a site, etc. to be described later), which are associated with the ordering of a stamp should not necessarily be identical to a user who receives the stamp.

(Description of Host Computer)

Figure 2:
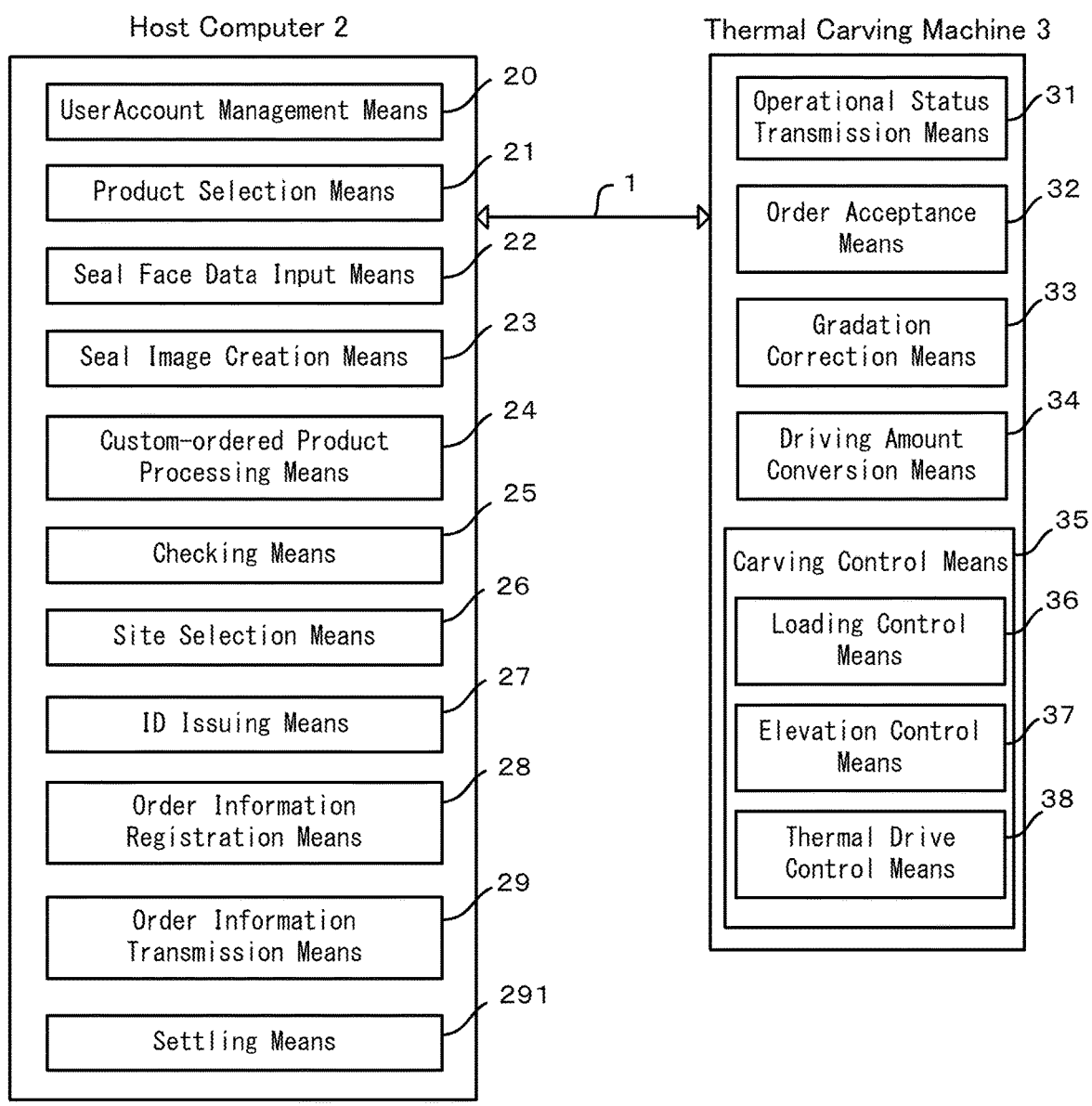
FIG. 2 is a block diagram illustrating various control means equipped in a host computer and a thermal carving machine.
Figure 3:
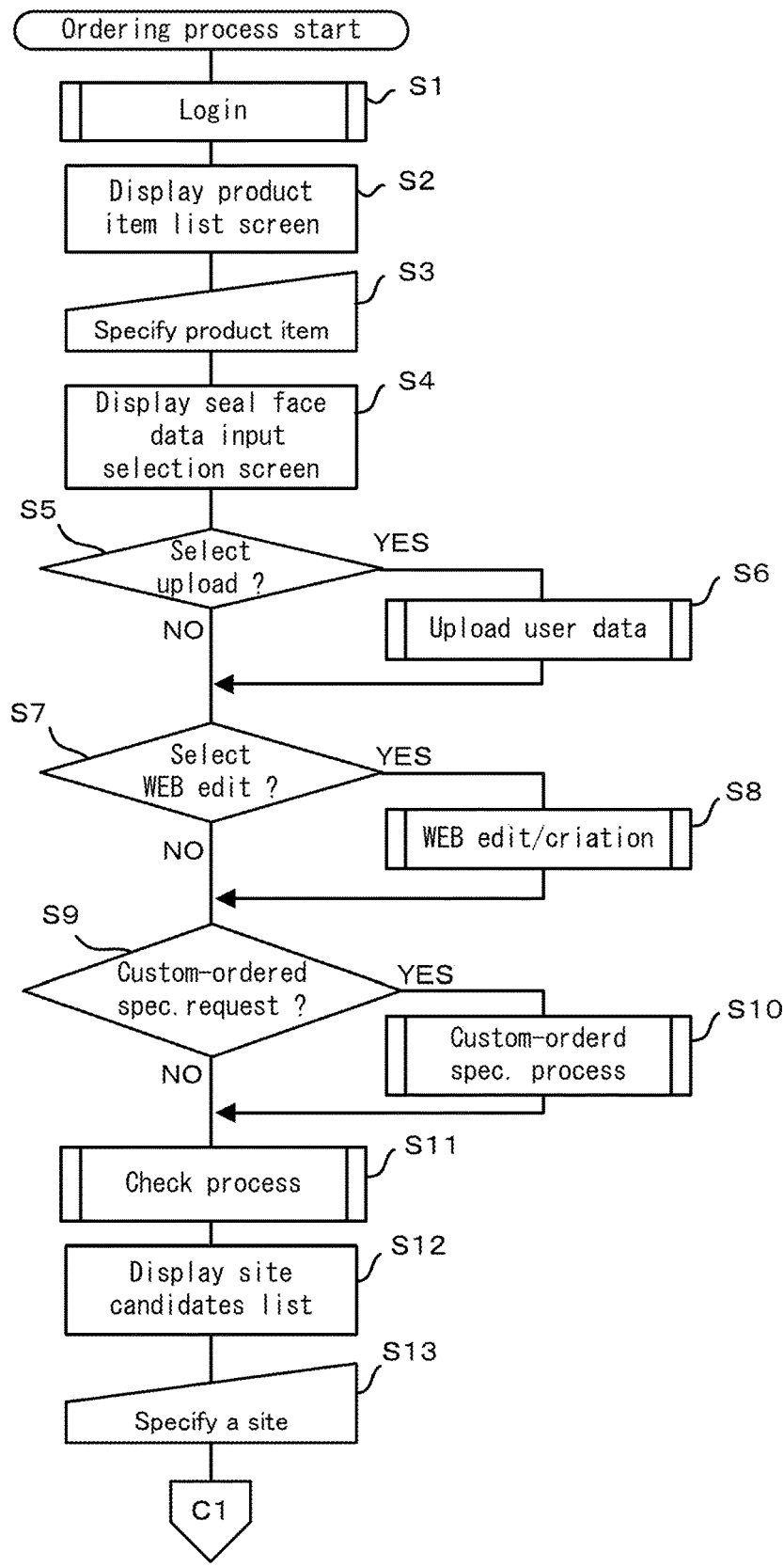
FIG. 3 is a flowchart illustrating a process relating to the ordering of a stamp.
Figure 4:
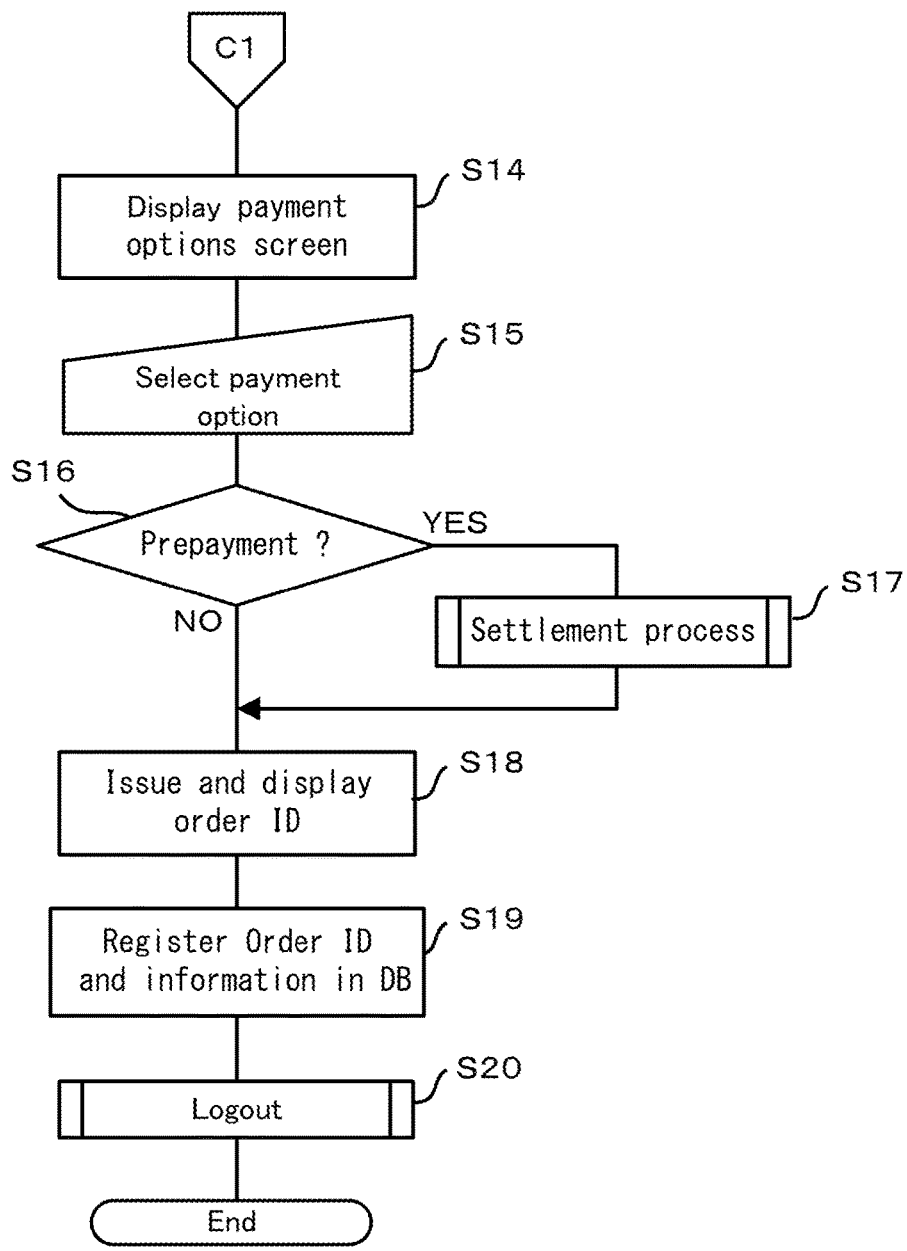
FIG. 4 is a flowchart further illustrating a process relating to the ordering of a stamp.

FIG. 2 illustrates blocks of various control means equipped in the host computer 2. FIGS. 3 and 4 are flowcharts which illustrate a sequence of processes relating to the ordering of a stamp. The various control means on the host computer 2 illustrated in FIG. 2 are described referring to the flowcharts of FIGS. 3 and 4.

(User Account Management Means)

First, a user who is going to order a stamp (user A) activates browser software from a user terminal 4U, connected to the network 1, to access the URL, of a Web server that the host computer 2 has, an initial screen for ordering a stamp (what is called homepage) is displayed on the user terminal 4U. Note that data communication between the Web server of the host computer 2 the user terminals 4, 4, . . . is basically carried out according to the HTTP (Hyper Text Transfer Protocol).

In the login process of step S1, user account management means 20 displays a login screen (not shown) on the user terminal 4U. When the user has a user account already registered to use the stamp ordering system, the user can log in this stamp ordering system to receive the stamp ordering service by inputting the name of the user account and a password from the user terminal 4U. When the user account management means 20 determines that the user account name and the password are legitimate, the user account management means 20 performs a process of allowing the login based on the account.

For a user who does not have a user account, the user account management means 20 may accept registration of the setting of a new user account, and then perform the login based on the new account. A method of using another account such as the account of a cloud service or social network service that is affiliated by the provider of the stamp ordering service, or a login method using a one-time password as a guest user may also be available.

(Product Selection Means)

Figure 5:
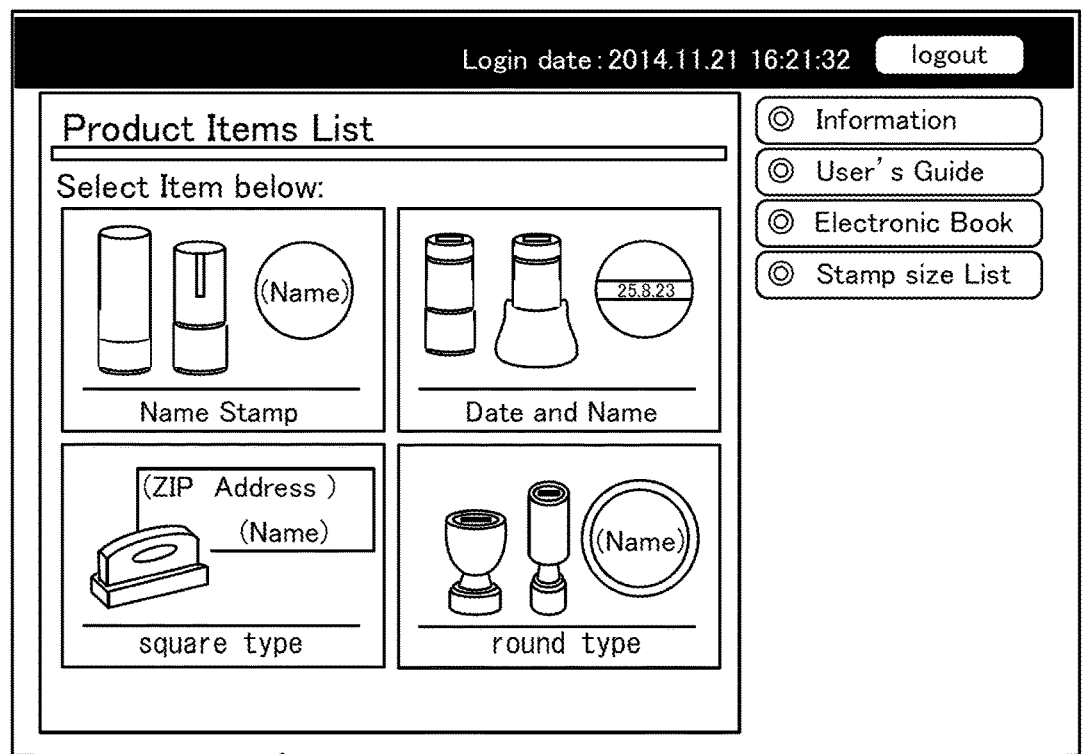
FIG. 5 is a diagram illustrating a product items list screen which is provided to a user terminal.

When the login process in step S1 is performed normally, product selection means 21 displays a product items list screen 51 (see FIG. 5) on the user terminal 4U in step S2. The user can select a product item (the kind of a stamp) by clicking one of a plurality of predetermined icons representing the photograph or picture of a desired stamp on the product items list screen 51 (step S3).

Figure 6:
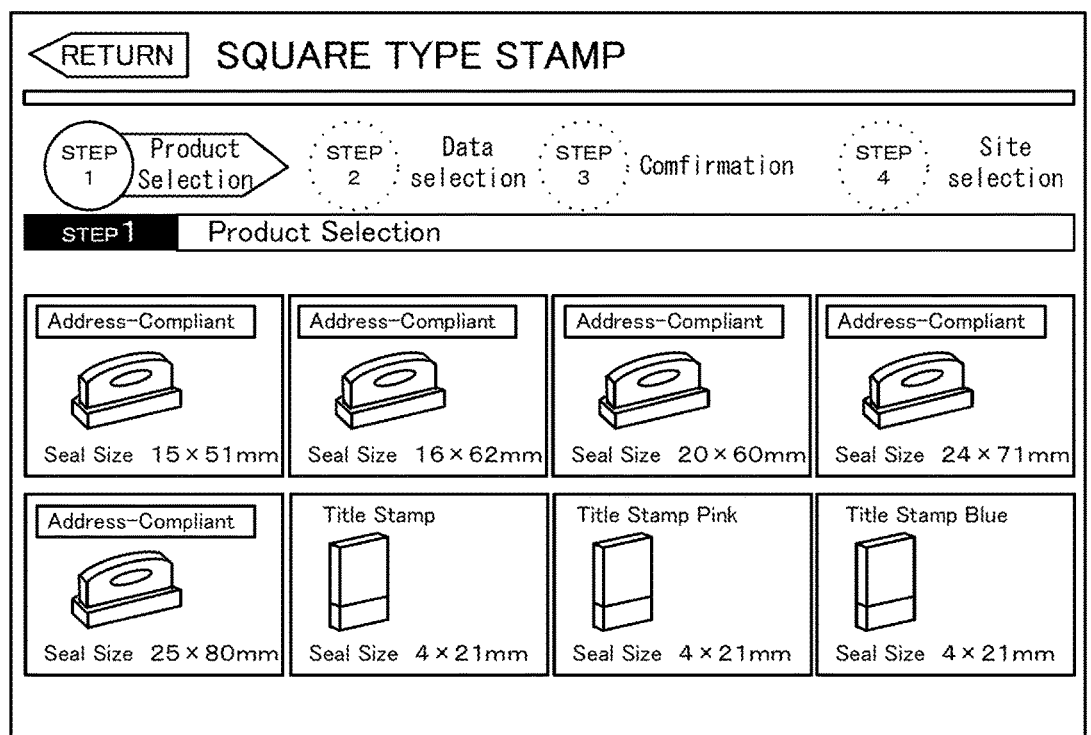
FIG. 6 is a diagram illustrating a seal face size selection screen which is provided to the user terminal.

The user can further select the details such as the type of. For example, after the user selects "square stamp" from the product items list, the product selection means 21 may display a seal face size selection screen 52 (see FIG. 6) on the user terminal 4U to select a seal face size. The user can select the size (type) of "square stamp" by clicking an icon illustrating the seal face size of the desired stamp.

(Seal Face Data Input Means)

Figure 7:
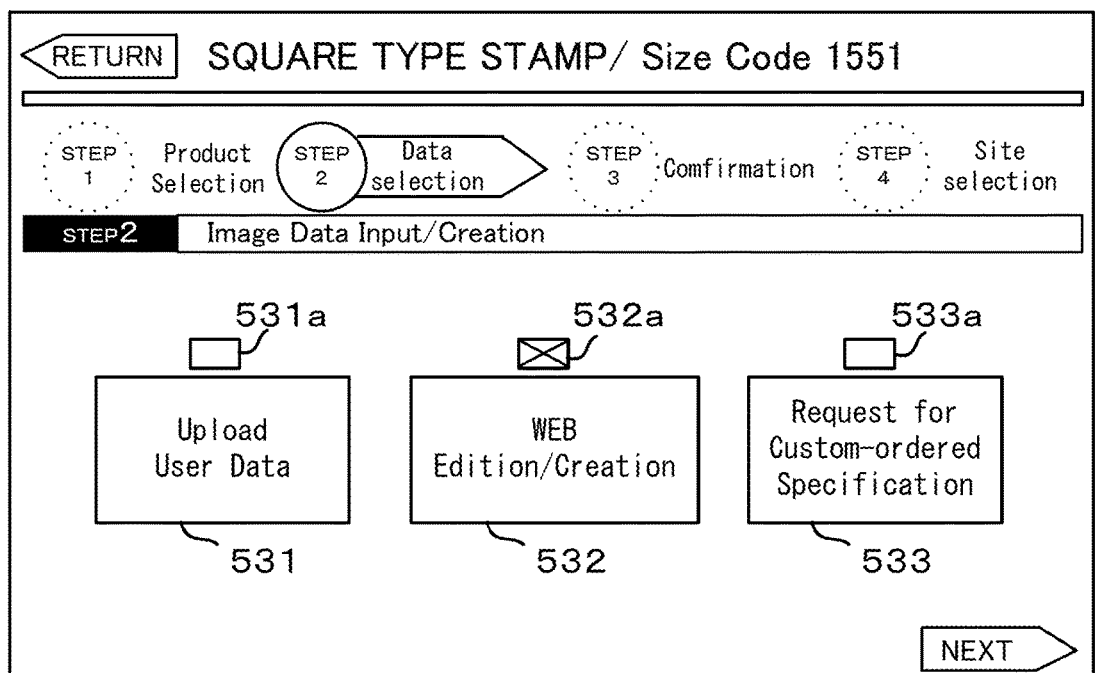
FIG. 7 is a diagram illustrating a seal face data input selection screen which is provided to the user terminal.

When the selection of a product is completed, seal face data input means 22 is then activated. The seal face data input means 22 displays a seal face data input selection screen 53 (see FIG. 7) on the user terminal 4U to allow the user to select how to input or create a seal image (artwork) (step S4). In the example of FIG. 7, selection icons 531, 532, 533 are displayed on the screen so that the use can select at least one of the input methods, "Upload User Data," "WEB Edition Creation" and "Request for Custom-ordered Specification." The user may also select a plurality of input methods simultaneously by checking individual check boxes 531a, 532a, 533a provided in correspondence to the respective selection icons.

When the icon 531 for "Upload User Data" is clicked (step S5: YES), for example, the seal face data input means 22 performs an upload process (step S6). In the upload process in step S6, first, an upload file designation screen (not shown) is displayed on the user terminal 4U. The user may specify a drive and a folder where image data prepared by the user is stored, and the name of the file of the image data on the screen. When the user specifies the storage source for the image data, the seal face data input means 22 automatically uploads the image data from the storage source into a data storage area for the user account in the database 2B.

The user may use ordinary screen editor software installed on an arbitrary terminal device to input a text (name, address, etc) to be written on the seal, edit the layout of the text or the like (also referred to as "seal layout") and set a font or the like, thereby creating image data. The format for image data that can be uploaded into the system may be the standard image compression format, such as GIF or PEG, besides the ordinary bit map. The seal face data input means 22 may include a process of converting the format of the file of the uploaded user image data into a format which seal image creation means 23 may edit next.

(Seal Image Creation Means)

When the icon 532 for "WEB Edition/Creation" is selected (step S7: YES) on the seal face data input selection screen 53 in FIG. 7, for example, the seal face data input selection screen 53 is activated to perform a WEB editing process (step S8). In the WEB editing process in step S8, the seal image creation means 23 provides the user terminal 4U with dedicated editor software (WEB editing software) for editing and creating seal image using the ASP (Application Service Provider) functionality of the host computer 2.

Figure 8:
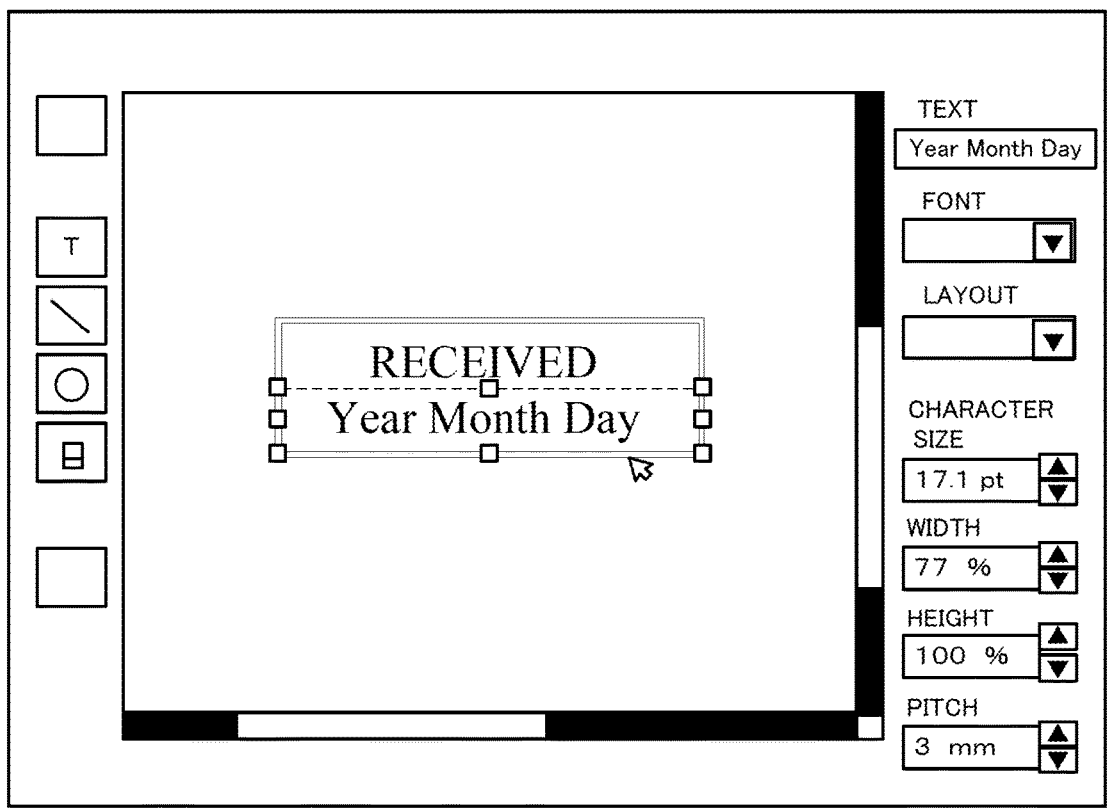
FIG. 8 is a diagram illustrating an edition screen based on Web edition software, which is provided to the user terminal.

More specifically; the seal image creation means 23 causes the user terminal 4U to display an edition screen as illustrated in FIG. 8, for example, by means of the WEB editing software. The seal image creation means 23 may read and load a template (square type, round type) corresponding to the selected product item, as initial data for the WEB editing software, from the database 2B.

The WEB editing software is provided with various tools useful for edition of a seal image, such as inputting of a text to be written on the seal and insertion of a design, organization of their layouts, changing the sizes thereof, and setting of character fonts. The user may edit and create a seal image using those tools as needed while viewing the edition screen displayed on the user terminal 4U. The seal image data created by the WEB editing software is automatically saved in the data storage area for the user account in the database 2B.

When image data created by the user has already been uploaded in the step S6, the seal image creation means 23 may load the image data as initial data into the WEB editing software. In this case, the user can re-edit the uploaded image data on the WEB to create final seal image data without inputting a text or the like from the beginning.

The seal image data that is created by the seal image creation means 23 is monochromatic artwork data, and should desirably have a resolution of, for example, 600 bdpi or higher.

(Custom-ordered Product Processing Means)

When the icon 533 for "Request for Custom-ordered Specification" is selected (step S9: YES) on the seal face data input selection screen 53 in FIG. 7, for example, a custom-ordered product process is performed so that a dedicated designer is requested to create an artwork based on a custom-ordered specification (step S10). In this step S10, custom-ordered product processing means 24 first displays a seal creation request form (not shown) on the user terminal 4U. The user may input the contents of the request for a desired custom-ordered product in a predetermined column in the seal creation request form specifically or in detail, and return the seal creation request form to the custom-ordered product processing means 24.

Examples of the contents of the request for the custom-ordered product may include designation of a classic font, designing of an original design, picture or background pattern, and organization of a balanced layout. Further, a user who is not familiar with the manipulation of the WEB editing software, or a user who has logged in with a cellular terminal or the like on which the WEB editing software is difficult to use may select this "Request for Custom-ordered Specification" to request a dedicated designer to create an artwork for even for an artwork of a pattern consisting of standard characters.

When a necessary procedure such as estimation or settlement relating to the custom order for the creation of a seal is completed, the custom ordered product processing means 24 creates custom-ordered product request data based on information input to the seal creation request form, and stores it in the database 2B. The artwork creating designer creates the original of the artwork (seal image) of the design corresponding to the user's custom order based on the custom-ordered product request read out using, for example, the dedicated terminal 7. The created artwork original is transformed into data, and delivered, into the database 2B.

The user who is informed of the delivery of the artwork by e-mail or the like may check the seal image on the WEB, and return a seal correction request form to the custom-ordered product processing means 24 if necessary. A designer in charge makes corrections to the artwork original based on the seal correction request. Through those processes, the seal image (artwork) as requested by the user can be finished.

(Checking Means)

When the input/creation of the seal image data is completed, a check process is performed (step S11). In this step S11, checking means 25 first checks any errors in the entry of the text or the like inserted in the seal image.

When the checking means 25 determines that a sequence of numbers equivalent to a zip code and a text corresponding to the name of a municipality and an address are written on the created seal image, for example, the checking means 25 checks their consistency based on zip code collation table data stored in the database 2B. When the zip code and the entry of the address do not match with each other, a screen for warning that effect may be displayed on the user terminal 4U. Further, the checking means 25 may display a zip code which appears correct in view of the written municipality name and the address on the user terminal 4U to prompt correction.

When a text corresponding to the address or residence such as the municipality name is written on the created seal image, the checking means 25 refers to municipality name data stored in the database 2B to check if the entry indicates the currently correct administrative name. When the administrative name is not determined correct, the checking means 25 may display a screen to warn that effect. When the checking means 25 determines that the written municipality name contains an error or contains an old place name or the like before synoecism, the checking means 25 may display what appears to be a correct municipality name on the user terminal 4U to prompt correction.

When the user identifies an error in the text in response to the warning in the Check process, the user may perform an operation to input an instruction for correction on the screen of the user terminal 4U. In this ease, the checking means 25 can perform a process of correcting the target error portion of seal image data to the displayed correct description.

After checking the entry, the checking means 25 causes the user terminal 4U to display a final confirmation screen 54 illustrated in, for example, FIG. 9. The user may check the contents registered for the order of the stamp (product) while viewing the final confirmation screen 54. The quantity of stamps ordered may be input on the final confirmation screen 54.

To change the contents of the order, the user may click, for example, a RETURN icon to return to a previous process or a previous screen. In addition, the user may click an icon for "STEP1," "STEP 2" or the like provided on the final confirmation screen 54 or the like to resume the ordering process at an associated step.

(Site Selection Means)

Figure 10:
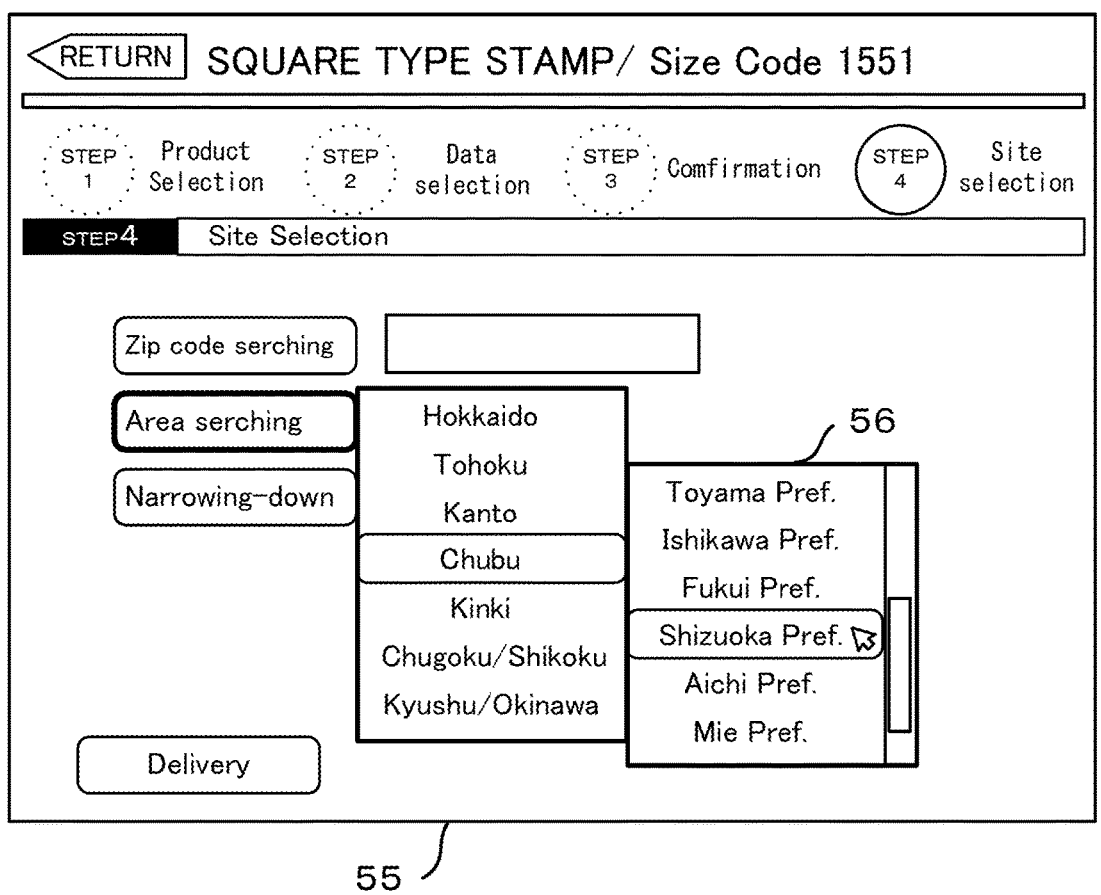
FIG. 10 is a diagram illustrating a site search screen which is provided to the user terminal.

When checking the registered contents such as the seal data is completed, site selection means 26 is activated. The site selection means 26 causes the user terminal 4U to display a site search screen 55 illustrated in, for example, FIG. 10 to search for a site the user desires to receive the stamp from among the sites where the thermal carving machines 3, 3, are connected to the network 1 in an available manner. On the site search screen 55, it is possible to input a zip code, and select a search target area from a pop-up window 56 or the like. It is also possible to narrow down the kind of a store to a stationery store, a convenience store or the like from the sites existing in the selected search target area.

The site selection means 26 refers to a site management data file stored in the database 2B to search, for the sites where available thermal carving machines 3, 3, . . . are located in the selected area. This site management data file is updated as needed based on operational status information that is transmitted from the thermal carving machines 3, 3, . . . at the individual sites over the network 1 as needed.

Figure 11:
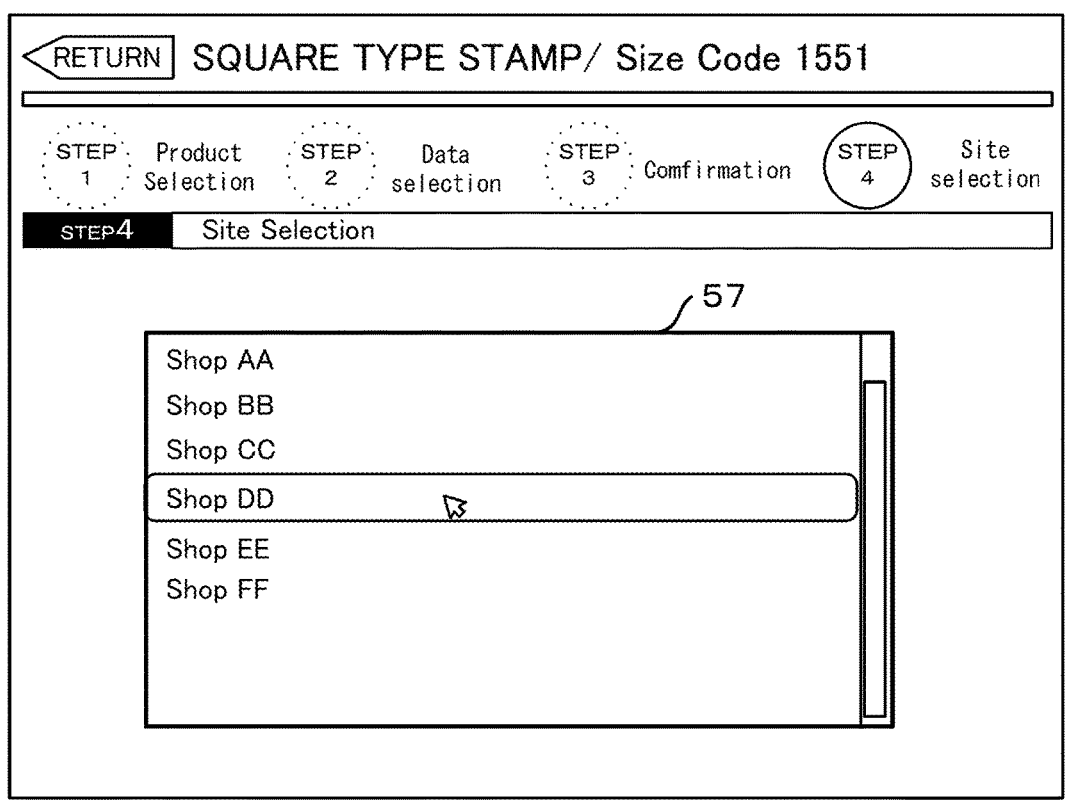
FIG. 11 is a diagram illustrating a screen showing a site candidates list which is provided to the user terminal.

The site selection means 26 displays a site candidates list 57 of the sites retrieved from the site management data file (see FIG. 11, for example) on the user terminal 4U (step S12). The user may click the icon of the name of a site at which the user wants to receive the product in the site candidates list 57 to select and specify the site (step S13).

When the user wants to avoid the carving work or cut out the time to go and receive the stamp, the user may click the icon of "Desire Delivery" on the site search screen 55 (see FIG. 10, for example) to proceed with reception of the product by delivery. In case of "Desire Delivery," the site where the stamp is to be carved may be specified, or the site may not be specified.

(Settling Means)

In the stamp ordering service according to the embodiment, a fee for carving a seal may be included in the price for a stamp. That is, the settlement for the stamp may be done by paying the expenses upon delivery of the assembled kit of the stamp (product). It is to be noted however that to request a store personnel for delivery or carving of the stamp, the host computer 2 may include settling means 291 that accepts prepayment for the stamp (product) in consideration of the wishes of the user or further convenience therefor.

The settling means 291 causes the user terminal 4U to display a payment options screen (not shown) to allow the user to select how to make the payment in step S14. The user may select prepayment or payment upon delivery from the payment options screen (step S15).

When the prepayment is selected (step S16: YES), the settling means 291 performs a settlement process (step S17). In the settlement process of step S17, the user may select a payment option of credit, electronic Forex, electronic settling service or the like to pay the expenses in advance according to the selected payment method.

(ID Issuing Means)

When the contents of ordering the stamp (product) are settled, ID issuing means 27 is activated to issue an order (step S18). The term "order ID" refers to identification information for identifying the settled contents of the order. The order information includes at least information on the type of the selected product (kind and size type of the stamp), created seal image data and the quantity of ordered products. The order information may include any information among the settled ordering date, the user account name, the site specified by the user, information on the custom-ordered product, and information on settlement.

The ID issuing means 27 displays the issued order ID on the user terminal 4U from which the login has been made to inform the user of the order ID (step S18). At the same time, the ID issuing means 27 may transmit information on the order ID to the registered e-mail address of the user.

(Order Information Registration Means)

Order information registration means 28 registers the issued order ID and the order information associated therewith in an order information data file in the database 2B (step S19). Accordingly, the history of the order information of each user is stored in the database 2B.

(Order Information Transmission Means)

The host computer 2 may include order information transmission means 29 that transmits the created seal image data over the network 1 to a thermal carving machine 3S that is installed at the site specified in step S13. The order information transmission means 29 may transmit the issued order ID and the order information associated therewith to the thermal carving machine 3S installed at the specified site. In this case, the order information transmitted to the thermal carving machine 3S may include any information among the type of the product (kind and size type of the stamp), the created seal image data, the quantity of ordered products, the settled ordering date, the user account name, the site specified by the user, information on the custom-ordered product, and information on settlement.

When the ordering process is completed, the user account management means 20 displays a logout screen (not shown) on the user terminal 4U. As the user clicks the icon of "Logout" on the screen, a logout process for the user account is performed (step S20).

(Description of Seal Carving Apparatus (Thermal Carving Machine))

Figure 12:
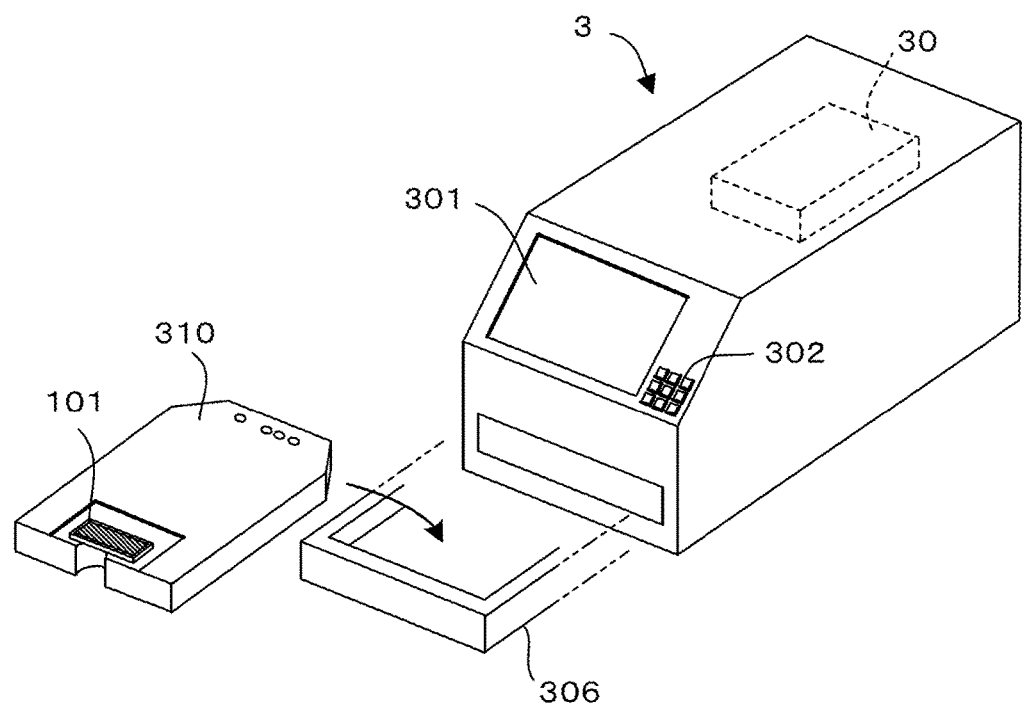
FIG. 12 is a perspective view of a thermal carving machine according to an embodiment.

FIG. 12 is a perspective view illustrating the thermal carving machine 3 that is an embodiment of the seal carving apparatus. Thermal carving machines 3 are installed for carving seals of porous stamps at a plurality of sites such as stationery stores over a wide area in the country. As illustrated in FIG. 12, the casing of the thermal carving machine 3 according to the embodiment is provided with a touch panel 301, ten keys 302 and the like for users (including an orderer and stamp sales person) to operate the thermal carving machine 3. Although not illustrated, a communication connector to connect to the network 1 network 1 such as the Internet, a power connector and the like are provided on the rear side of the thermal carving machine 3.

FIG. 12 illustrates the embodiment that has a control device 30 incorporated inside the casing of the thermal carving machine 3. According to a mode different from this embodiment, the thermal carving machine 3 may be an external personal computer or a POS (Point Of Sales) system in a store which is provided with all or some of the functions of the control device 30 to be described below to serve as a thermal carving machine.

Figure 13:
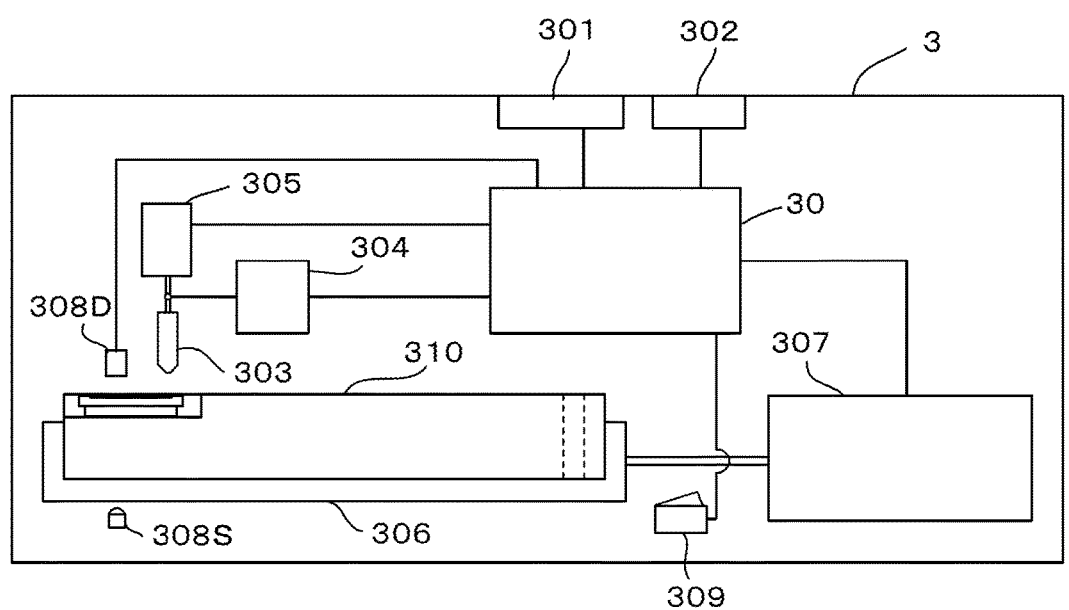
FIG. 13 is a block diagram illustrating some main parts of the thermal carving machine.

A porous impression die 101 which is the seal member of a porous stamp is set on a dedicated attachment 310 as illustrated in FIG. 12. The thermal carving machine 3 includes a tray 306 which serves as means for transferring the attachment 310, and a loading mechanism 307 (see FIG. 13) provided inside the thermal carving machine 3 is configured to reciprocally transfer the attachment 310 between a discharge position where the attachment 310 is attachable/detachable and an internal accommodation position.

Figure 14:
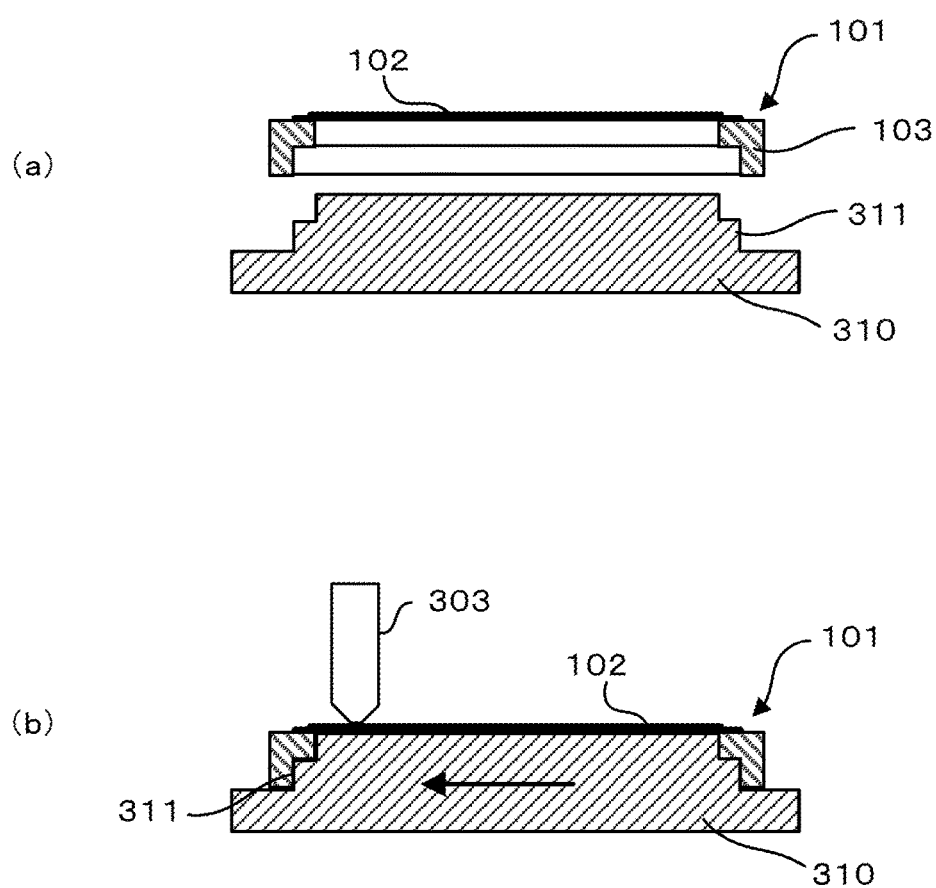
FIG. 14 is a cross-sectional view illustrating an attachment and a porous impression die.

FIG. 14 is a cross-sectional view of the attachment 310 and the porous impression die 101 to be set on the attachment 310. The porous impression die 101 is formed to have a rectangular enclosing frame 103 and a porous film 102 stretched so as to block the upper surface opening of the frame 103. The term "front surface" or "top surface" refers to the surface of that side where a seal is to be formed, and the term "rear surface" or "bottom surface" refers to the surface of a side opposite to that side where a seal is to be formed. The rear surface opening of the frame 103 is formed wider than the front surface opening.

The porous impression die 101 is set on the attachment 310 as the porous impression die 101 is fitted over a pedestal 311 from the bottom side of the frame 103 (see FIG. 14A). As the porous impression die 101 is moved in a direction orthogonal to the line of a thermal head 303 abutting on the top surface of the porous impression die 101 set on pedestal 311, line-by-line seal carving is carried out (see FIG. 14B).

Referring again to FIG. 2, the individual control means provided on the control device 30 of the thermal carving machine 3 are described.

(Operational Status Transmission Means)

Operational status transmission means 31 performs a process of transmitting information on the operational status (operational status information) of the thermal carving machine 3 to the host computer 2 over the network 1 as needed, preferably at regular intervals. The operational status information includes status information indicating whether the thermal carving machine 3 is ready for operation or is stopped for maintenance or the like, along with a site-code indicating the site of the thermal carving machine 3. As described already, the host computer 2 updates the site management data file stored in the database 2B based on the operational status information which is transmitted from individual sites as needed. The host computer 2 can know the thermal carving machine 3 at which site is currently connected to the network 1 in an available manner by referring to the site management data file in the database 2B.
(Order Acceptance Means)

Figure 15:
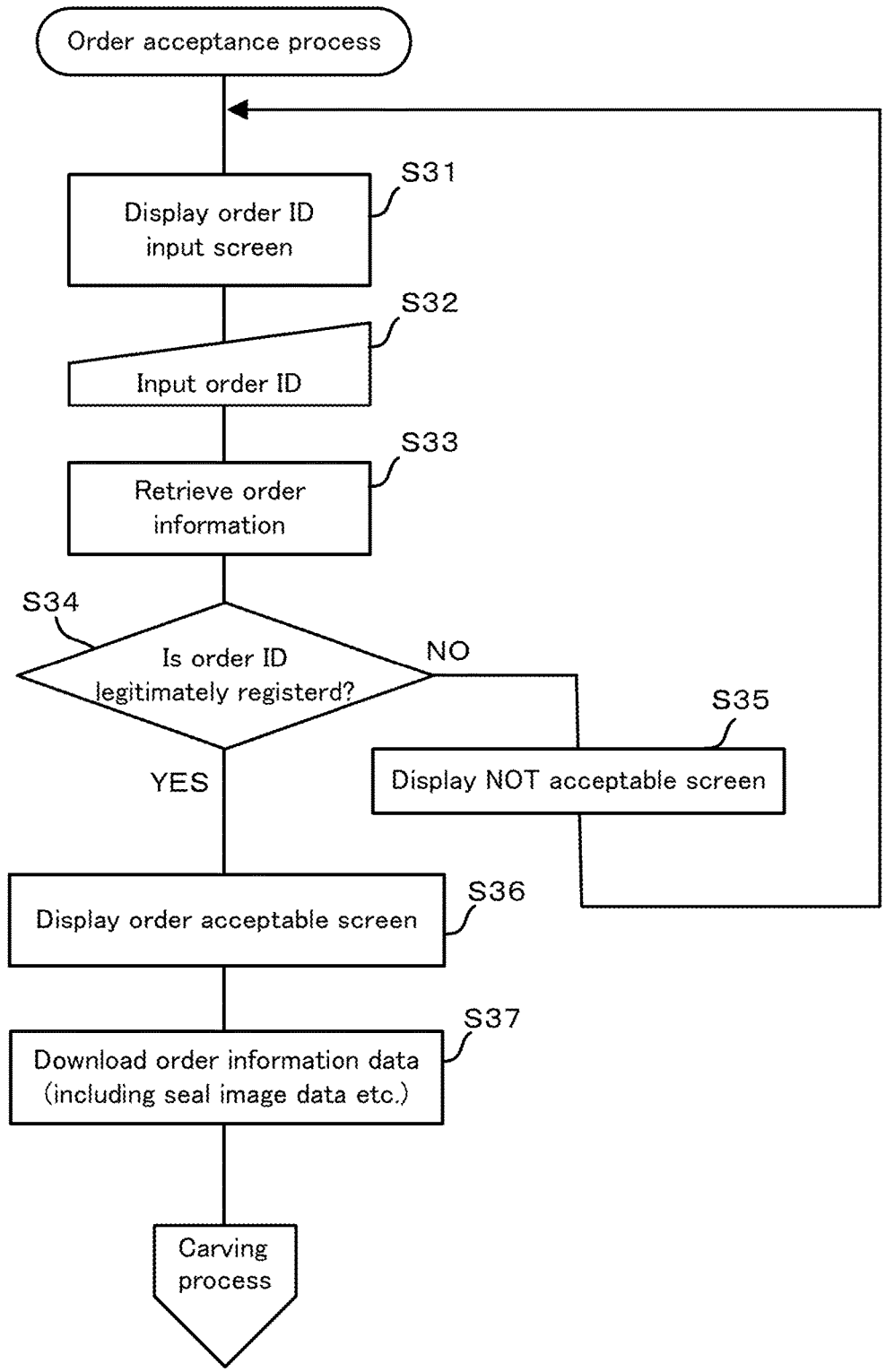
FIG. 15 is a flowchart illustrating a process which is performed by order acceptance means of the thermal carving machine.

FIG. 15 is a flowchart illustrating a process which is performed by order acceptance means 32. Referring to the diagram, when the thermal carving machine 3 is ready for operation, an order ID input screen is displayed on the touch panel 301 (step S31). An orderer who has visited the site specified at the time of placing an order on the user terminal 4U inputs the informed order ID operating the touch panel 301 on which this input semen is displayed or the ten keys 302 (step S32). At the shop of the site the person who has ordered the stamp has visited, the orderer may asks a sales person or the like to carry out all the works including inputting the order ID, carving the seal and assembling the stamp, or a partial work such as carving of the seal. When the orderer has selected "Desire Delivery" on the WEB (user terminal 4), a personnel at the site who has been informed of the selection may perform works of carving a stamp and assembling the stamp, and deliver the completed product to the orderer.

The order acceptance means 32 refers to the order information data file stored in the database 2B over the network 1 to retrieve the order information of the input order ID (step S33). When the input order ID is not legitimately registered in the order information data file (step S34: NO), the order NOT acceptable screen indicating that seal carving cannot be accepted is displayed on the touch panel 301 (step S35), and the display returns to the display of the order ID input screen upon elapsing of a predetermined time (step S31).

When a consistency between the information with respect to the site where the order ID has been input (i.e., the site where the thermal carving machine 38 equipped with the order acceptance means 32 is located) and the site-code described in the retrieved order information is not determined, as a result of searching the order information data file in the database 213 based on the input order ID, the order acceptance means 32 does not basically accept seal carving at the site. To allow the user who has ordered the stamp to carry out carving at a site other than the site specified at the time of placing the order, however, the user may be verified based on additional information such as user account information (account name and/or password) together with, for example, the order ID so that an order for cawing the stamp may be accepted.

The expressions "at the time of placing an/the order" and "at the time of accepting an/the order" are equivalent to a period in which the user terminal 4 is logged in this stamp ordering system.

In an embodiment in which the host computer 2 transmits order information along with information on the order ID to the control device 30 at the site specified at the time of placing the order through the user terminal 4, the order acceptance means 32 may determine Whether the input order ID is legitimate or not based on the information on the order ID or the order information stored in memory means in the control device 30, rather than based on the order information data file in the database 2B.

When the order acceptance means 32 determines that the input order ID is legitimate (step S34 YES), the order acceptance means 32 displays on the touch panel 301 an order acceptance screen for showing the completion of the acceptance of the order (step S36). Then order acceptance means 32 then downloads order information needed for carving, such as seal image data, the kind and size of the stamp, the quantity of ordered products which correspond to the order ID into the memory means in the control device 30 from the order information data file stored in the database 2B (step S37). As a result, various conditions (parameters) for thermally carving the seal are set in the thermal carving machine 3 (control device 30).

In an embodiment in which the host computer 2 transmits seal image data to the control device 30 at the site specified at the time of placing the order through the user terminal 4, the process of downloading the seal image data in the step S36 is unnecessary, thus shortening the time for accepting an order.
(Gradation Correction Means)

Seal image data to be loaded into the memory means in the control device 30 is stored therein in a binary (monochromatic) bit map form. For example, the pixel value of what is called "black" corresponds to the print portion. (impression part) of a stamp is "1," and the pixel value of what is called "white" corresponds to the non-print portion (non-impression part) of a stamp is "0." This binary artwork data representing a seal pattern to be carved is referred to as "monochromatic image data." The basic operation of seal carving in the thermal carving machine 3 is to thermally drive the heat generating elements on the thermal head 303 selectively to heat and melt the top surface of the porous impression die 101 which is in abutment with the thermal head 303 for solidification of the top surface, so that the nor-impression part which has lost the porousness is formed on the top surface of the porous impression die 101. Therefore, basically, the control device 30 can carve a seal by performing ON/OFF control according to the monochromatic image data.

However, such simple ON/OFF control according to binary monochromatic image data brings about a problem such that the residual heat accumulated in the thermal head 303 is loaded at the position of the edge of the non-impression part to the region of a nearby impression part. As a result, part of the porousness (ink permeability) of the contour of the print portion is lost, which may bring about an inconvenience such that the contour becomes narrower than that of the original image data or is deformed or the like. To prevent such deformation of a print, the control device 30 includes gradation correction means 33 that corrects monochromatic image data to gradation image data having a gradation of, for example, 8 bits (256 gradations), the terminal device 90 according to the embodiment includes gradation data preparing means that prepares gradation image data having, for example, gradation of 8 bits (256 gray scales) in this embodiment.

Figure 16:
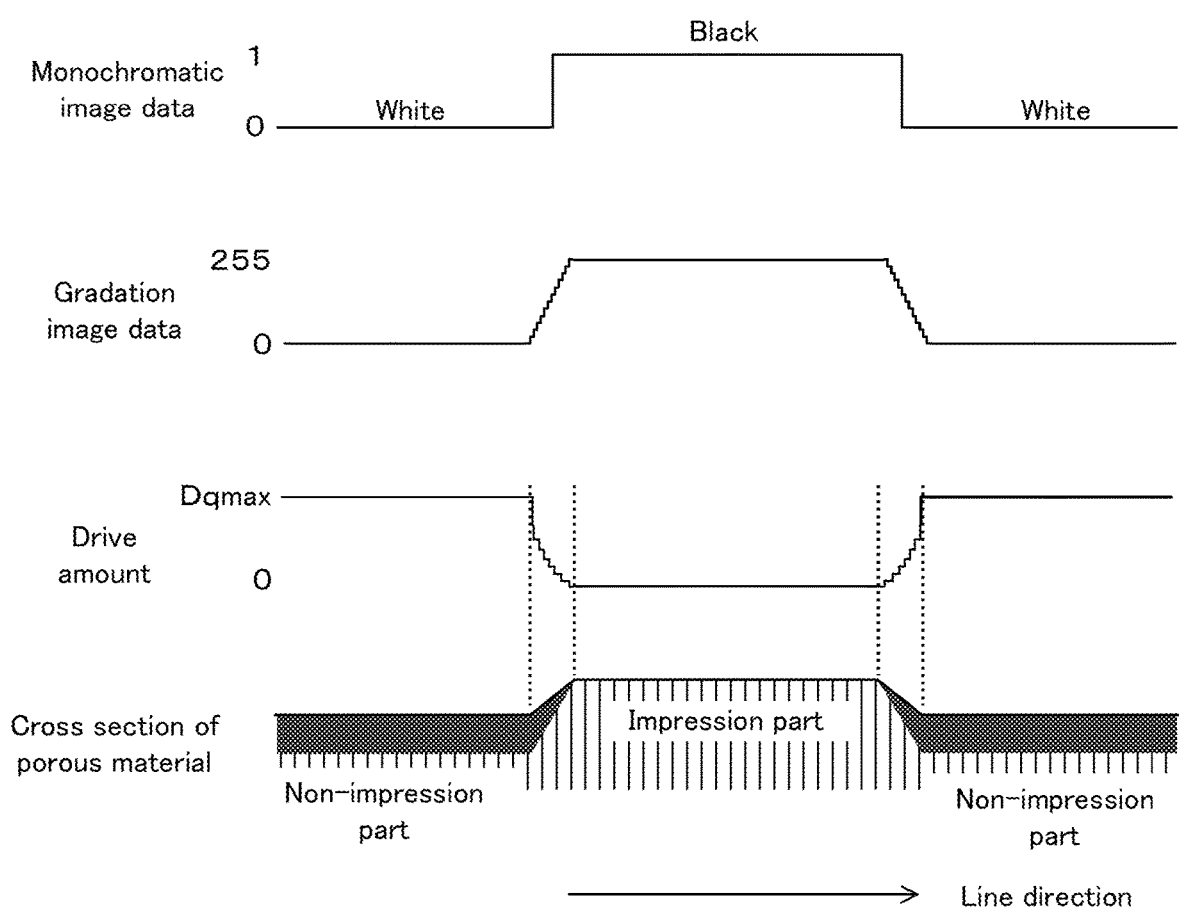
FIG. 16 is a block diagram illustrating artwork data, gradation image data, drive amount data, and the cross section of a porous material.

The gradation correction means 33 prepares gradation image data corrected so that the pixel value monotonously changes stepwise in the boundary region (region at which the values of white and black are reversed) between the print portion (impression part) and the non-impression part of monochromatic image data as illustrated in FIG. 16, for example. "Monotonous change" referred to herein includes a case where gradation image data is corrected non-linearly based on monochromatic image data.
(Driving Amount Conversion Means)

Driving amount conversion means 34 included in the control device 30 converts the corrected line-by-line gradation image data to data on the driving amount of each heat generating element on the thermal head 303. At this time, the driving amount conversion means 34 may consider the correlation property between the driving amount of the heat generating elements and the porousness (ink permeability) at the time of calculating the driving amount of the heat generating elements.

Now, the permeation ratio of ink which is an index indicating the porousness quantitatively can be defined as a permeation ratio which is normalized with the initial porosity of the porous material before thermal carving being regarded as 1 (100%) and the porosity of the porous material after the heat generating elements are driven with a maximum driving amount Dqmax being regarded as 0 (0%). Because the porous material contracts slightly and changes its thermal conductivity according to heating and melting, the driving amount of the heat generating elements and the ink permeability may not necessarily be proportional to each other. Therefore, it is preferable that non-linear correlation property data between the driving amount of the heat generating elements and the ink permeability; Which has been measured through an experiment or the like beforehand, should be prestored in the memory means in the control device 30.

In consideration of the non-linear correlation property between the driving amount of the heat generating elements and the ink permeability, the gradation correction means 33 may create gradation image data.

(Carving Control Means)

Figure 17:
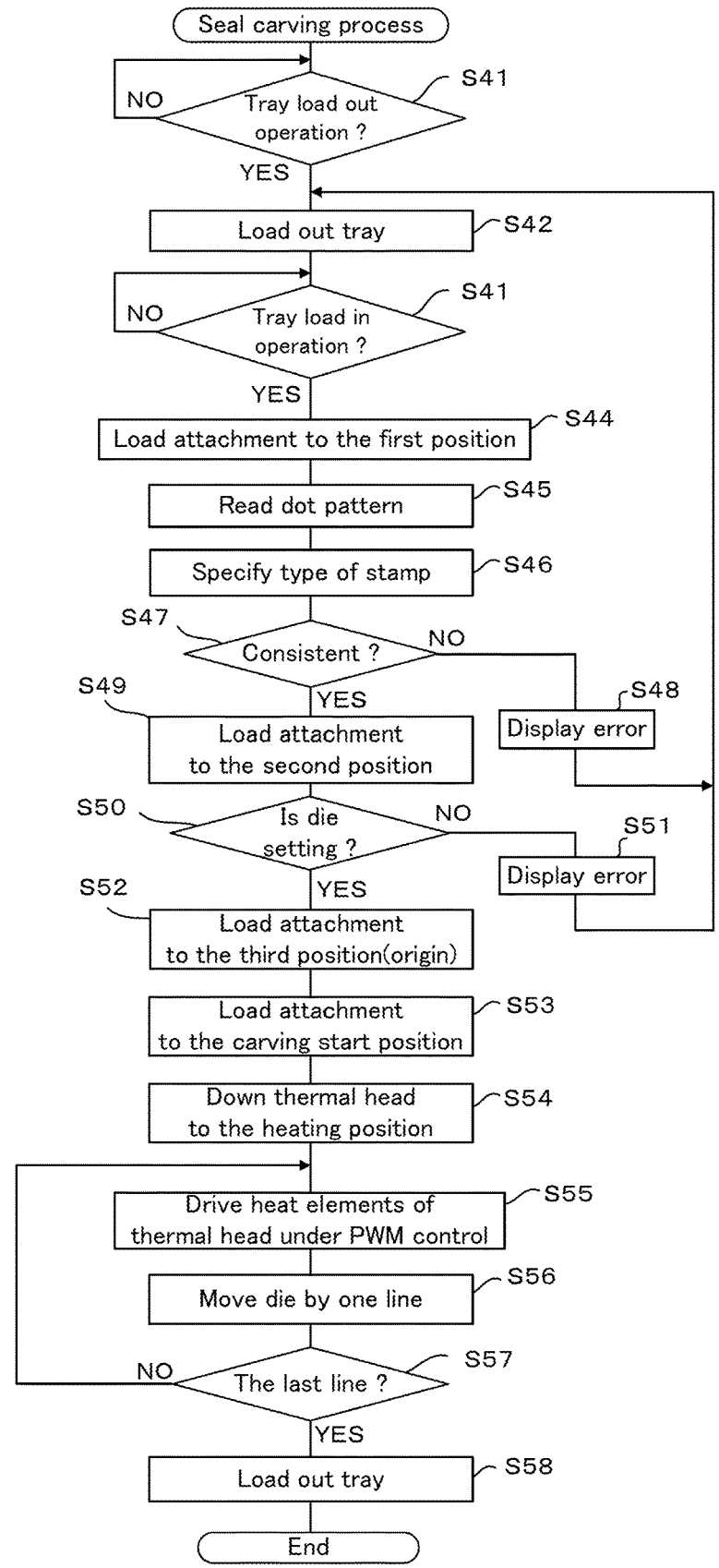
FIG. 17 is a flowchart illustrating a seal carving process which is performed by carving control means of the thermal carving machine.
Figure 18A:
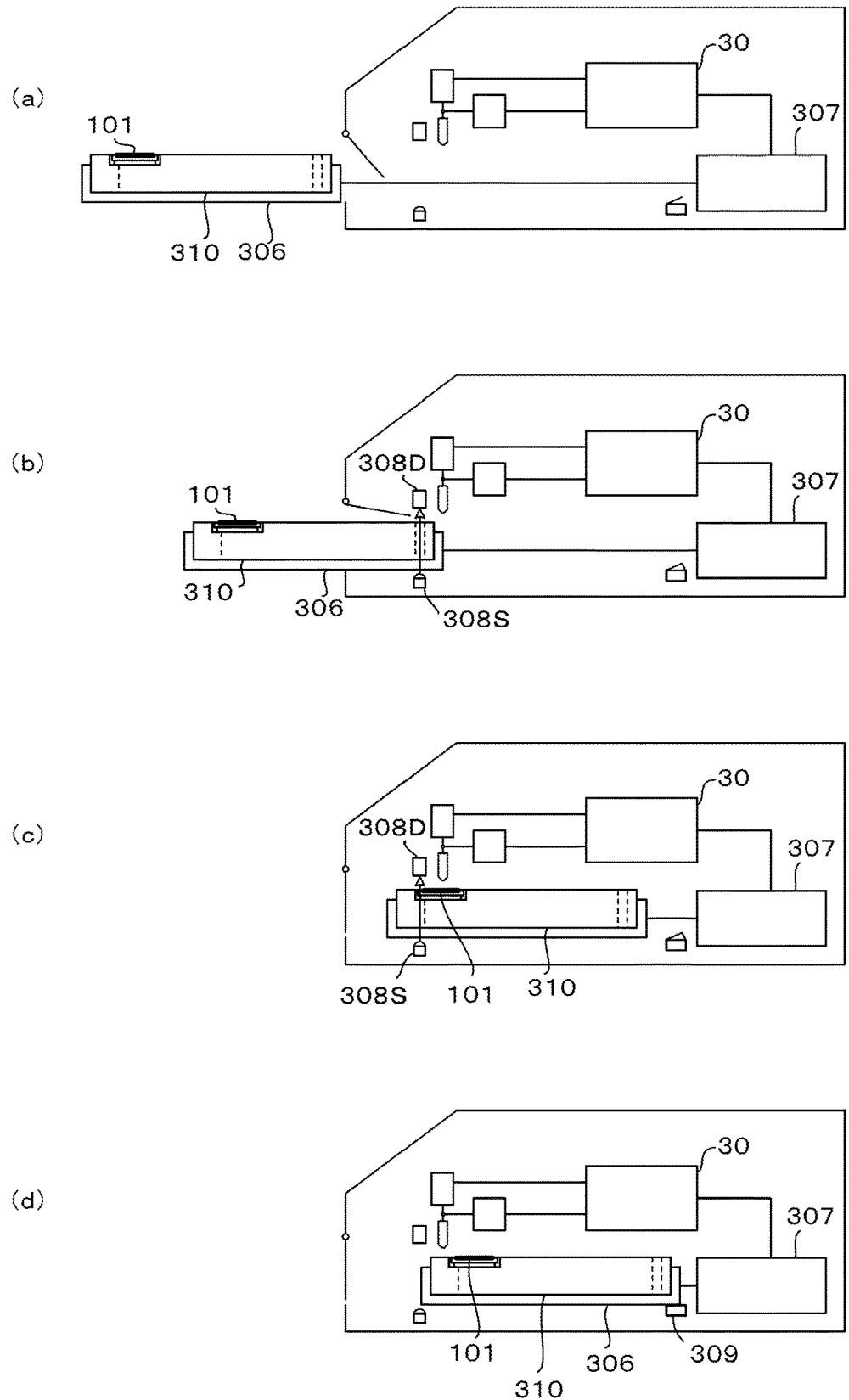
FIG. 18A is a diagram for describing a seal carving operation of the thermal carving machine.
Figure 18B:
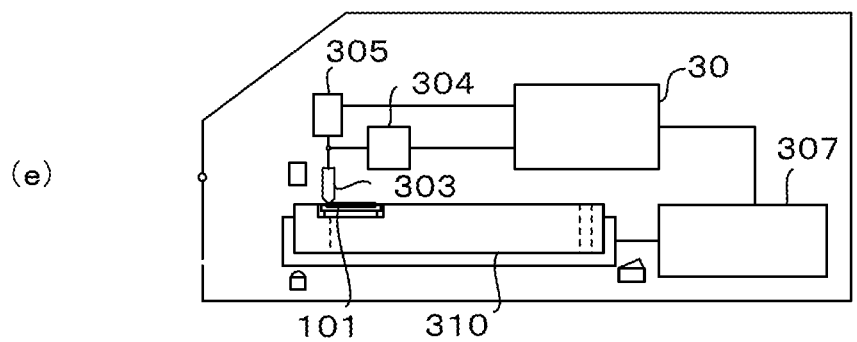
FIG. 18B is a diagram for further describing the seal carving operation of the thermal carving machine.
Figure 18B:
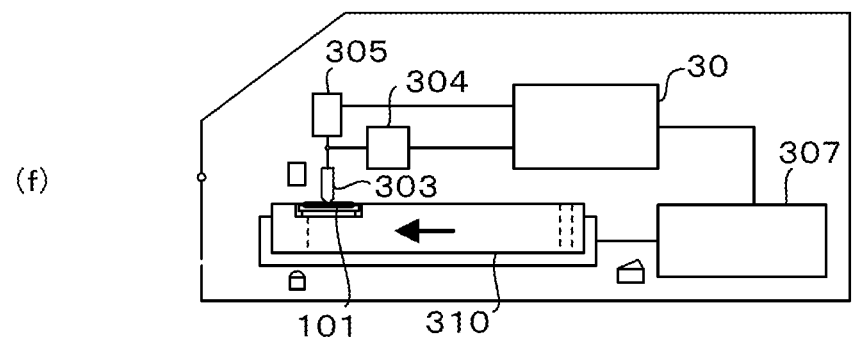
Figure 18B:
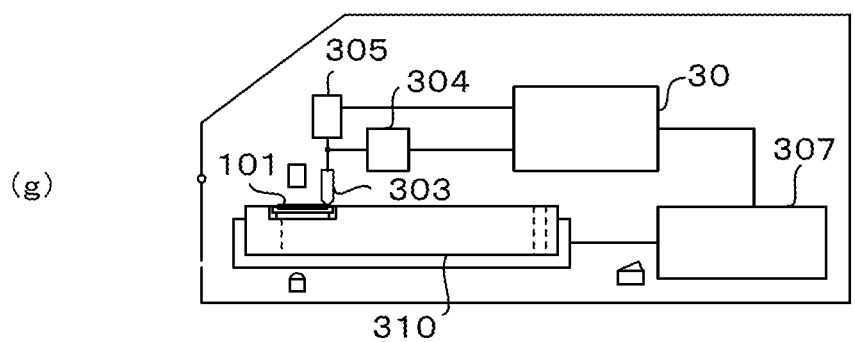

The following describes a seal carving process that is performed by carving control means 35 provided in the control device 30. FIG. 17 is a flowchart illustrating the seal carving process that is performed by the carving control means 35. FIGS. 18A and 18B are diagrams for describing the seal carving operation of the thermal carving machine 3.

An orderer buys an assemble kit for a porous stamp 100 at a site the orderer has visited, sets a porous impression die 101 contained in the kit on the thermal carving machine 3, and performs seal carving to be described below. When the orderer request a personnel or the like at the site to carve the seal, as described above, or when the orderer has selected "Desire Delivery" at the time of placing an order, the personnel in charge which has accepted the request performs seal carving to be described below.

First, the user (the orderer or the stamp-selling person who has been requested to perform carving) sets the porous impression die 101 in a predetermined position of the dedicated attachment 310. When the user performs an operation of loading out the tray 306 via the touch panel 301 or the like (step S41), the loading control means 36 controls the loading mechanism 307 to move the tray 306 to the discharge position illustrated in FIG. 18A(a) (step S42).

The user mounts the attachment 310 on the discharged tray 306 (FIG. 18A(a)), When the user performs an operation of loading in the tray 306 via the touch panel 301 or the like (step S43), the loading control means 36 loads in the tray 306 to a first load-in position illustrated in FIG. 18A(b) (step S44). In this first load-in position, photosensors 308S, 308D read the dot pattern of perforations formed in the attachment 310 (step S45).

Figure 19:
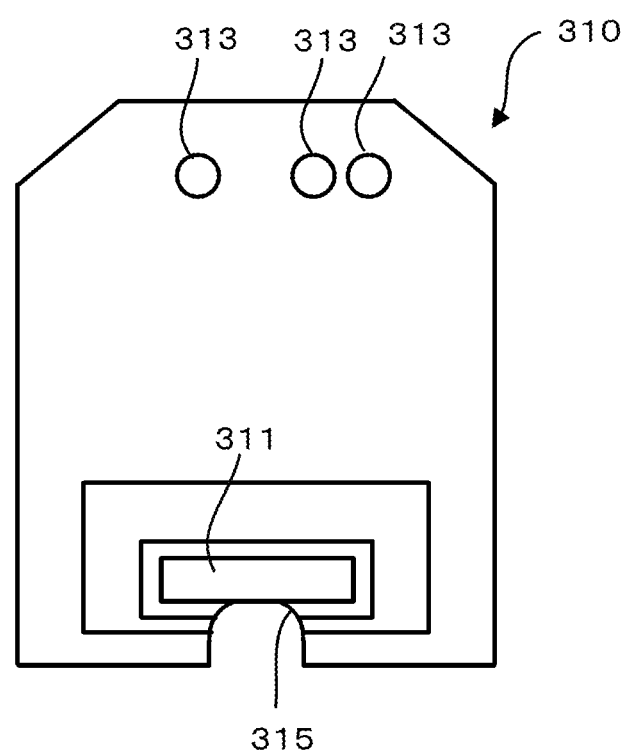
FIG. 19 is a front view of an attachment for a porous impression die according to an embodiment.

A line of dot pattern perforations 313, 313, . . . , which are predetermined according to the type of the stamp, are formed through the attachment 310 as illustrated in FIG. 19. A U-shaped cutaway groove 315 is formed at an edge portion of the attachment 310.

In subsequent step S46, the control device 30 identifies the type of the mounted attachment 310 and the type (kind and carving size) of the porous impression die 101 set on the attachment 310 based on the read dot pattern. The identified type information may be displayed on the touch panel 301 of the thermal carving machine 3. In step S47, consistency between the type information included in the downloaded order information and the type information of the attachment 310 identified from the dot pattern of the attachment 310 is determined. When those information are not consistent with each other (step S47: NO), an error may be displayed on the touch panel 301 (step S48), and the tray 306 is returned to the discharge position (step S42). Accordingly, the user may be urged to redo the operation. In this way, it is possible to identify the type of a set porous impression die 101 at the time the attachment 310 is mounted, which is prior to the initiation of the carving. This makes it possible to prevent an improper processing manipulation or the like.

When it is determined that both type information are consistent with each other (step S47: YES), the loading control means 36 controls the loading mechanism 307 to load the tray 306 and the attachment 310 to a second load-in position which lies further inside the thermal carving machine 3 illustrated in FIG. 18A(c) (step S49). Then, the mount state of the porous impression die 101 onto the attachment 310 is examined (step S50). When the porous impression die 101 is not set on the attachment 310 or is not properly set thereon (step S50: NO), an error is displayed on the touch panel 301 (step S51), and the tray 15 is returned to the discharge position (step S42).

When it is determined that the porous impression die 101 is properly set on the attachment 310 (step S50: YES), the loading control means 36 controls the loading mechanism 307 to load the tray 306 and the attachment 310 to a third load-in position (origin position), the deepest position illustrated in FIG. 18A(d) (step S52). At this position, an origin sensor 309 is turned on, thereby setting the origin for the loading. A photosensor that senses blocking of light when the tray 306 or the attachment 310 contacts the sensor may be used as the origin sensor 309.

The control device 30 identifies the carving start position and the heating height position of the thermal head 303 based on the type information which is included in the order information and the type information which is identified from the dot pattern of the attachment 310. Then, the loading control means 36 controls the loading mechanism 307 to load the porous impression die 101 to the carving start position (step S53). After the porous impression die 101 is loaded to the carving start position, elevation control means 37 controls an elevation mechanism 305 to move the thermal head 303 downward to the heating height position (step S54). As illustrated in FIG. 18B(e), at this stage, the thermal head 303 positioned at the carving start position abuts on the porous impression die 101.

In subsequent step S55, thermal drive control means 38 performs PWM control on thermal drive means 304 according to one line of driving amount data to selectively and thermally drive the heat generating elements on the thermal head 303. Accordingly the porous impression die 101 is thermally carved by one line. In next step S56, the loading control means 36 controls the loading mechanism 307 to move the porous impression die 101 by a one-line width in the load-out direction. As the processes of steps S55 and S56 are repeated, seal carving of the porous impression die 101 is carried out line by line (FIG. 18B(f)). When completion of the processing of the last line is decided in step S57 (FIG. 18B(g)), the elevation control means 37 controls the elevation mechanism 305 to move the thermal head 303 upward to the standby position, and the loading control means 36 controls the loading mechanism 307 to load the tray 306 to the discharge position (step S58).

Figure 20:
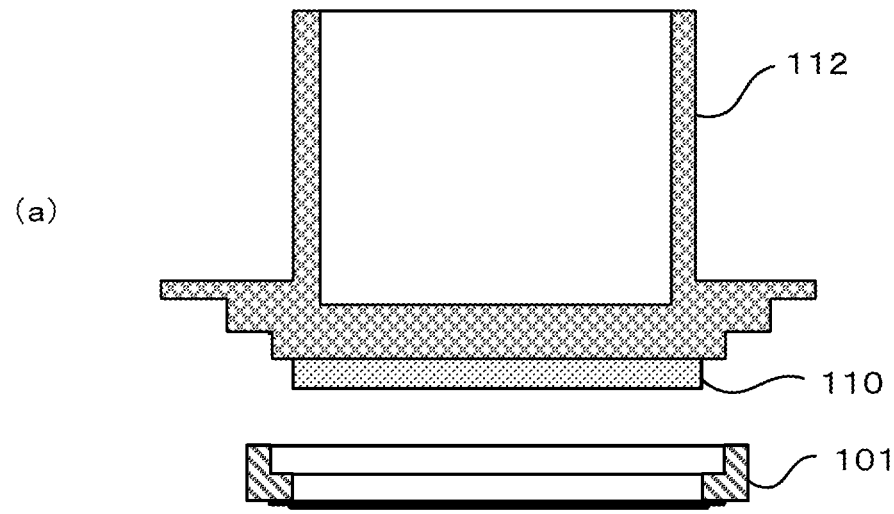
FIG. 20 is a cross-sectional view for describing how to assemble a porous stamp according to an embodiment.
Figure 20:
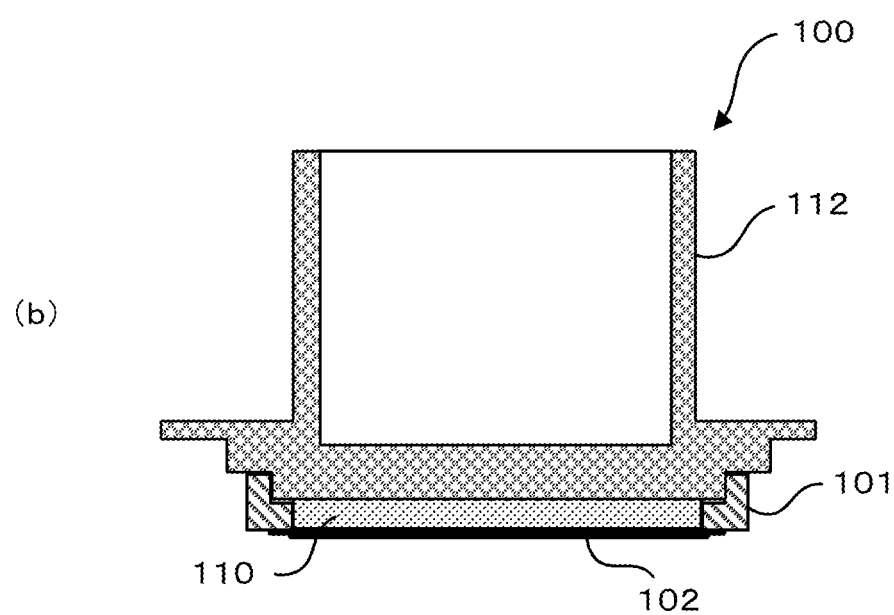

The user can take out the attachment 310 from the discharged tray 306 to obtain the porous impression die 101 with the seal carved thereon. This way, the orderer can operate the thermal carving machine 3 at the site he/she has visited to obtain a porous impression die 101 himself/herself, or asks a salesperson to carve a seal to acquire a porous impression die 101 carved there. As illustrated in FIG. 20, attaching an ink impregnated member 110 and a holder 112 to the porous impression die 101 having a seal carved thereon, the orderer can assemble the stamp 100 having a unique seal pattern as ordered. Even in this case, the orderer may ask a sales person or the like to carry out a sequence of works up to the assembling of the stamp, and receive a commodity ordered as a product at the visiting site or upon delivery.

The stamp ordering system according to the embodiment demonstrates the following advantages.
(1) It is easy to order a stamp desired by an orderer and create a seal easily. Particularly, the host computer 2 provides WEB edition software over the network 1, so that a user can easily design a seal image (artwork) with a high originality using a general-purpose terming device (user terminal 4U).
(2) An orderer can arbitrarily specify a site where a stamp is carved, thereby receiving the stamp relatively quickly when the orderer specifies a site near his/her residence.
(3) According to the aspect where the host computer 2 transmits seal image data to a specified site at the time an orderer places an order, it is possible to shorten the time for accepting an order at the specified site.
(4) The order acceptance means 32 equipped in the thermal carving machine 3 accepts an order ID input when information on the order ID is registered in the database 28. That is, because seal carving is accepted only at the site where an orderer has specified at the time of placing the order, the contents of the order for the stamp can be kept secret from a third party who does not know the specified site. This can improve the security.
(5) The charge for a stamp may have seal carving expenses, so that the orderer can make payment in exchange of the stamp, facilitating the settlement. This eliminates the need for a settlement process on the user terminal 4U, thus simplifying the processing and operation.
(6) The checking means 25 of the host computer 2 can check and correct any input error made by an orderer at the time of creating a seal image on the user terminal 4.

From the above, it is possible to provide a stamp ordering service very convenient to users.

REFERENCE SIGNS LIST

1 Network
2 Host computer
2B Database
3 (3S) Thermal carving machine (seal carving apparatus)
4 (4U) User terminal (terminal device)
7 Dedicated terminal
20 User account management means
21 Product selection means
22 Seal face data input means
23 Seal image creation means
24 Custom-ordered product processing means
25 checking means
26 Site selection means
27 ID issuing means
28 Order information registration means
29 Order information transmission means
30 Control device
31 Operational status transmission means
32 Order acceptance means
33 Gradation correction means
34 riving amount conversion means
35 Carving control means
36 Loading control means
37 Elevation control means
38 Thermal drive control means
51 Product items list screen
52 Seal face size selection screen
53 Seal face data input selection screen
54 Final confirmation screen
55 Site search screen
56 Pop-up window
57 Site candidates list
100 Porous stamp
101 Porous impression die
102 Porous film
103 Frame
110 Ink impregnated member
112 Holder
301 Touch panel
302 Ten keys
303 Thermal head
304 Thermal drive means
305 Elevation mechanism
306 Tray
307 Loading mechanism
308 Photosensors
309 Origin sensor
310 Attachment
311 Pedestal
313 Perforations

What is claimed is:

1. A stamp ordering system including a host computer which is connected to a network, and a plurality of seal carving apparatuses located at a plurality of sites in such a way so as to be connected to the network,
the host computer is connected to a database of a data storage device, which is configured to store information on user accounts, order information and operational information for the plurality of seal carving apparatuses, with the data storage device connected to the network, the host computer comprising:
seal image creation means that creates seal image data in such a way that a user using a terminal device connected to the network creates a seal image having the seal image data such that the seal image data created by the user is stored in the database of the data storage device;
site selection means that allows the user to specify at least one of the plurality of sites where the seal carving apparatuses connected to the network are located for placing an order for a stamp, which includes where the stamp is carved, based on the seal image data;
ID issuing means that issues an ID for identifying set contents of the order;
order information registration means that registers information on the issued ID and order information associated with the issued ID in the database of the data storage device connected to the network; and
order information transmission means that transmits the issued ID to the specified at least one of the plurality of seal carving apparatuses connected to the network,
each of the seal carving apparatuses located at the plurality of sites comprising:
a thermal head having a plurality of individual heat generating elements;

a control device for controlling the seal carving apparatus, the control device including:
order acceptance means that inputs the issued ID and accepts the input of the issued ID that is registered in the database of the data storage device connected to the network; and
carving control means that performs a control process of selectively and thermally driving the individual heat generating elements with the thermal head in abutment with a porous material having an ink permeability that is non-proportional to driving amounts of the individual heat generating elements such that a non-linear correlation property between the driving amounts of the individual heat generating elements and the ink permeability of the porous material is determined, the carving control means uses the non-linear correlation property to create corrected gradation image data based on the seal image data and the carving control means thermally drives the individual heat generating elements by a driving amount based on the corrected gradation image data, which forms a seal image on the porous material, thereby performing seal carving of the stamp ordered by the user based on the seal image data which is identified by the accepted issued ID.

2. The stamp ordering system according to claim 1, wherein
when ordered via the terminal device, the host computer transmits the seal image data over the network to the seal carving apparatus specified by the user.

3. The stamp ordering system according to claim 1, wherein
when ordered via the terminal device, the host computer transmits the order information over the network to the seal carving apparatus specified by the user.

4. The stamp ordering system according to claim 1, wherein
the order acceptance means of the seal carving apparatus retrieves the order information based on the input of the issued ID, and does not accept the input of the issued ID on the site where the seal carving apparatus is located does not match site information in the retrieved order information.

5. The stamp ordering system according to claim 1, wherein the control device of each seal carving apparatus further comprises operational status transmission means that transmits operational status information of the seal carving apparatus over the network to the host computer at regular intervals.

6. A method of ordering a stamp in a system including a host computer which is connected to a network, and a plurality of seal carving apparatuses located at a plurality of sites in such a way so as to be connected to the network, the host computer is connected to a database of a data storage device that is connected to the network, the database of the data storage device is configured to store information on user accounts, order information and operational information for the plurality of seal carving apparatuses, the host computer comprising: seal image creation means; site selection means; ID issuing means; order information registration means; and order information transmission means, with each of the seal carving apparatuses located at the plurality of sites comprising a thermal head having a plurality of individual heat generating elements and a control device, the control device including order acceptance means and carving control means;
the method comprising steps to be executed by the host computer, the steps including:
creating seal image data, in the seal image creation means, in such a way that a user using a terminal device connected to the network creates a seal image having the seal image data such that the seal image data created by the user is stored in the database of the data storage device;
allowing the user to specify, in the site selection means, at least one of the plurality of sites where the seal carving apparatuses connected to the network are located for placing an order for a stamp, which includes where the stamp is carved, based on the seal image data;
issuing an ID, in the ID issuing means, for identifying set contents of the order;
registering information, in the order information registration means, on the issued ID and order information associated with the issued ID in the database of the data storage device connected to the network; and
transmitting, in the order information transmission means, the issued ID to the specified at least one of the plurality of the seal carving apparatuses connected to the network,
the method further comprising steps to be executed by each of the seal carving apparatuses, the steps including:
in the order acceptance means, inputting the issued ID and accepting the input of the issued ID that is registered in the database of the data storage device connected to the network; and
in the carving control means, performing a control process of selectively and thermally driving the individual heat generating elements with the thermal head in abutment with a porous material having an ink permeability that is non-proportional to driving amounts of the individual heat generating elements such that a non-linear correlation property between the driving amounts of the individual heat generating elements and the ink permeability of the porous material is determined, using the non-linear correlation property to create corrected gradation image data based on the seal image data and thermally driving the individual heat generating elements by a driving amount based on the corrected gradation image data, which forms a seal image on the porous material, thereby performing seal carving of the stamp ordered by the user based on the seal image data which is identified by the accepted issued ID.

* * * * *